United States Patent
Park et al.

(10) Patent No.: US 10,747,430 B2
(45) Date of Patent: Aug. 18, 2020

(54) KEYBOARD FOR TYPING CHINESE CHARACTER

(71) Applicants: BENEDEA INC., Seoul (KR); Seoul National University R&DB Foundation, Seoul (KR)

(72) Inventors: Kunsoo Park, Seoul (KR); Hyunjoon Kim, Seongnam-si (KR); Hyun-Kyung Noh, Seoul (KR)

(73) Assignees: BENEDEA INC., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 16/134,734

(22) Filed: Sep. 18, 2018

(65) Prior Publication Data

US 2019/0087088 A1    Mar. 21, 2019

(30) Foreign Application Priority Data

Sep. 18, 2017 (KR) .................. 10-2017-0119735

(51) Int. Cl.
*G06F 3/0488* (2013.01)
*G06F 3/01* (2006.01)
*G06F 3/023* (2006.01)

(52) U.S. Cl.
CPC .......... *G06F 3/04886* (2013.01); *G06F 3/018* (2013.01); *G06F 3/0236* (2013.01)

(58) Field of Classification Search
CPC ..... G06F 3/018; G06F 3/04886; G06F 3/0236
See application file for complete search history.

(56) References Cited

U.S. PATENT DOCUMENTS

| | | | | |
|---|---|---|---|---|
| 5,119,296 A | * | 6/1992 | Zheng | G06F 3/018 715/263 |
| 5,378,068 A | * | 1/1995 | Hua | B41J 3/01 345/171 |
| 6,686,852 B1 | * | 2/2004 | Guo | G06F 3/018 341/22 |
| 6,809,725 B1 | * | 10/2004 | Zhang | G06F 3/018 345/171 |
| 2004/0155869 A1 | * | 8/2004 | Robinson | G06F 3/0219 345/168 |
| 2019/0012077 A1 | * | 1/2019 | Noh | G06F 3/04886 |

FOREIGN PATENT DOCUMENTS

| | | |
|---|---|---|
| KR | 10-2005-0115386 A | 12/2005 |
| KR | 10-2005-0115792 A | 12/2005 |
| KR | 10-0662553 B1 | 2/2007 |
| KR | 10-2013-0007135 A | 1/2013 |
| KR | 10-2015-0111329 A | 10/2015 |

* cited by examiner

*Primary Examiner* — Tadesse Hailu
(74) *Attorney, Agent, or Firm* — Hauptman Ham, LLP

(57) ABSTRACT

Provided is a keyboard for typing Chinese character, which includes a first base unit key group including subgroups of base unit keys having similar shapes to each other, a second base unit key group including base unit keys having symmetrical shapes with each other, and a third base unit key group including subgroups of base unit keys which are different from the base unit keys included in the first base unit key group and having similar shapes to each other.

9 Claims, 23 Drawing Sheets

KEYBOARD FOR TYPING CHINESE CHARACTER

CROSS-REFERENCE TO RELATED APPLICATIONS

This application claims the priority of Korean Patent Application No. 10-2017-0119735 filed on Sep. 18, 2017, in the Korean Intellectual Property Office, the disclosure of which is hereby incorporated by reference in its entirety.

TECHNICAL FIELD

The present disclosure relates to a keyboard for typing a Chinese character.

BACKGROUND ART

Along with the recent developments in China, an increasing number of people want to learn Chinese characters or already use them. Unlike Hangul (Korean characters) or English alphabets which have a relatively simple character system and have a less number of characters, Chinese character ("Hanzi") is the ideogram that includes a hieroglyph and has tens of thousands of characters. Therefore, it is impossible to input Chinese character directly by using a limited number of keyboards of an electronic device such as a computer, a mobile phone, and so on, and it is thus extremely difficult to input Chinese character using the electronic device.

For a conventional method of inputting Chinese character, generally, pinyin input method ("pinyin") and Wubizixing input method ("Wubi") (i.e., five stroke character model input method) are most widely used.

First, the pinyin input method is a method of inputting a pronunciation of a Chinese character with Roman keyboard and listing candidates of characters with the same pronunciation and selecting a character desired to input from among them. However, this method has a disadvantage in that it is difficult to input correct corresponding Chinese character when the user does not know the correct pronunciation, regardless of whether he/she knows the form of the Chinese character. Also, when there are too many Chinese characters having the same pronunciation, there is a disadvantage in that it is difficult to input Chinese character quickly because it is necessary to select a character to input from among a large number of Chinese character groups having the same pronunciation in order to input one character.

Second, the Wubi input method is a method of constructing a Chinese character using a keyboard having an arrangement of strokes and radicals of Chinese character and inputting the resultant Chinese character. To use the Wubi input method, it is necessary to memorize the symbols and arrangement of keys on the keyboard, and also know the order of strokes and have skills to input the Wubi.

The Wubi input method has an advantage that it is possible to input Chinese character faster than pinyin input method for those who are accustomed to it. However, it also has a disadvantage that it is relatively more difficult to learn than pinyin input method. This is because some Chinese characters are so difficult to input intuitively that it is necessary to use the Wubi dictionary. Therefore, there is a disadvantage that a long time training is required to input Chinese character with the Wubi input method.

As a result, a new Chinese character input apparatus is required, which is capable of inputting a Chinese character faster than pinyin input method, and which is easier to input and is more intuitive than Wubi input method.

SUMMARY

An object of the present disclosure is to provide a keyboard for typing Chinese character, which includes keys having base units or middle units that do not use a pronunciation of Chinese character disposed thereon, through which it is possible to input a Chinese character quickly and easily.

It is another object of the present disclosure to provide a keyboard for typing Chinese characters, which includes keys disposed according to a form of a base unit or to a position of a middle unit in the Chinese character, with which Chinese character can be easily inputted without requiring a user to learn for a long time.

The objects of the present disclosure are not limited to the above mentioned objects, and other objects and advantages of the present disclosure which are not mentioned can be understood by the description below and more clearly understood by the embodiments of the present disclosure. It is to be easily understood that the objects and advantages of the present disclosure can be realized by the means shown in the claims and combinations thereof.

In order to accomplish the above object, an embodiment of the present disclosure includes: a first base unit key group including subgroups of base unit keys having similar shapes to each other, a second base unit key group including base unit keys having symmetrical shapes with each other, and a third base unit key group composed of subgroups of base unit keys which are different from the base unit keys included in the first base unit key group and having similar shapes to each other.

According to the embodiments of the present disclosure described above, there is an advantage that it is possible to provide a keyboard for typing Chinese character, which includes keys having base units or middle units that do not use a pronunciation of Chinese character disposed thereon, through which it is possible to input a Chinese character quickly and easily.

In addition, according to the embodiments of the present disclosure described above, there is an advantage that it is possible to provide a keyboard for typing Chinese characters, which includes keys disposed according to a form of a base unit or to a position of a middle unit in the Chinese character, with which Chinese character can be easily inputted without requiring a user to learn for a long time.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
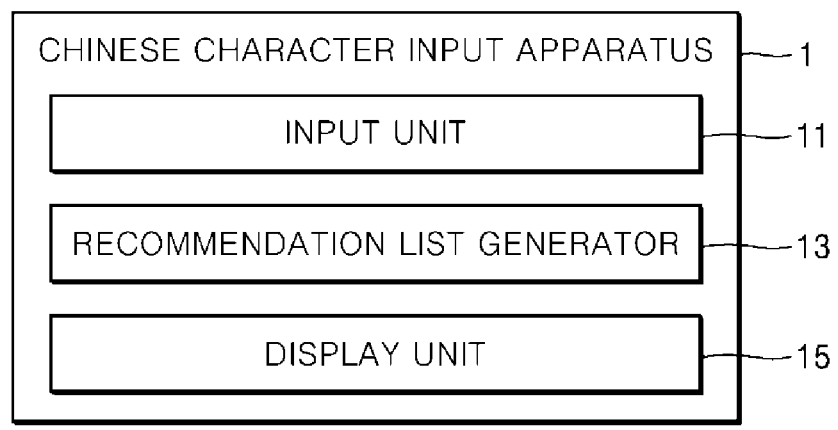
FIG. 1 is a block diagram showing a schematic configuration of a Chinese character input apparatus according to an embodiment of the present disclosure.

The above objects, features and advantages will be described in detail below with reference to the accompanying drawings to facilitate those skilled in the art to easily implement the technical concept of the present disclosure. In the below description of the present disclosure, a detailed description of known functions and configurations incorporated herein will be omitted when it may make the subject matter of the present disclosure rather unclear. Hereinafter, preferred embodiments according to the present disclosure will be described in detail with reference to the accompanying drawings. In the drawings, the same reference numerals are used for indicating the same or similar elements.

In the present disclosure, the 'base unit' means a smallest unit of a Chinese character. That is, Chinese characters can be generated through a combination of one or more base units. In the present disclosure, the user may input one or more base units to the Chinese character input apparatus to generate one or more Chinese characters, and the user may select a Chinese character to be inputted among the one or more generated Chinese characters.

In the present disclosure, a Chinese character input method using a combination of base units includes an intermediate process of generating a middle unit. A 'middle unit' used herein refers to a basic unit of a Chinese character that may be generated through a combination of one or more base units. The middle unit may include the radicals of Chinese characters, and the middle unit itself may be Chinese character.

In the present disclosure, the user may input the base unit to the Chinese character input apparatus through the keyboard for typing Chinese character. Hereinafter, the process of inputting Chinese characters by the user using the Chinese character input apparatus will be described in detail with reference to FIGS. 1 to 11.

FIG. 1 is a block diagram showing a schematic configuration of a Chinese character input apparatus according to an embodiment of the present disclosure.

Referring to FIG. 1, a Chinese character input apparatus 1 according to an embodiment of the present disclosure includes an input unit 11, a recommendation list generator 13, and a display unit 15.

The input unit 11 receives one or more base units, middle units, Chinese characters, or words from a user. In this example, one or more middle units that the input unit 11 receives from the user include a basic middle unit to be described below with reference to FIGS. 5A and 5B.

In the present disclosure, the base unit means a smallest unit of a Chinese character. Therefore, the Chinese character may be generated through a combination of one or more base units, and the user may input a base unit for generating Chinese character through the input unit 11. Table 1 below lists exemplary base units that may be inputted to the Chinese character input apparatus 1 according to an embodiment of the present disclosure.

TABLE 1

| 1 | ㄴ | 2 | ㄴ | 3 | ㄷ | 4 | ⁊ | 5 | ㄱ | 6 | ㄱ | 7 | ㄱ | 8 | ㄱ | 9 | ㄥ | 10 | 〈 |
|---|---|---|---|---|---|---|---|---|---|---|---|---|---|---|---|---|---|---|---|
| 11 | ∖ | 12 | ╎ | 13 | ╱ | 14 | ─ | 15 | • | 16 | ╎ | 17 | ╲ | 18 | ╎ | 19 | ) | 20 | ㄷ |
| 21 | ㄹ | 22 | ㄴ | 23 | ㄴ | 24 | ㄴ | 25 | ㄱ | 26 | ⤴ | | | | | | | | |

In the present disclosure, a Chinese character input method using a combination of base units includes an intermediate process of generating a middle unit. A 'middle unit' used herein refers to a basic unit of a Chinese character that may be generated through a combination of one or more base units. The middle unit may include the radicals of Chinese characters, and the middle unit itself may be Chinese character. That is, a middle unit may be generated through a combination of one or more base units, and a Chinese character may be generated through a combination of one or more middle units.

The recommendation list generator 13 generates a list of recommended middle units, a list of recommended Chinese characters, or a list of recommended words based on the base unit, the middle unit, or the Chinese character inputted from the user.

The display unit 15 displays a base unit, a middle unit, a Chinese character, or a word inputted by the user on the input window, and displays, on a recommendation list window, a list of recommended middle units, a list of recommended Chinese characters, or a list of recommended words generated by the recommendation list generator 13.

In one embodiment of the present disclosure, the Chinese character input apparatus 1 may be an electronic device such as a computer, a smart-phone, a tablet PC, and so on, and the method of the input unit 11 for receiving a base unit from a user, and the method of the display unit 15 for displaying the base unit and the like on an input window and displaying a list of recommended middle units, and the like on a recommendation list window may vary depending on the type of electronic device that constitutes the Chinese character input apparatus 1.

For example, when the Chinese character input apparatus 1 is a computer, the input unit 11 may receive a base unit, and so on by typing on a keyboard for typing Chinese character connected to the computer or a mouse click by a user. At this time, the display unit 15 may transmit visual information to the user through an external display device such as a monitor, and so on connected to the computer.

In the present disclosure, the visual information transmitted to the user by the display unit 15 may include all information required by the user to input Chinese character. Particularly, the visual information may include information on a base unit, a middle unit, a Chinese character, or a word that may be displayed by the display unit 15 to be described below on an input window, a recommendation list window, and so on.

In another embodiment, when the Chinese character input apparatus 1 is a smart-phone or a tablet PC, the input unit 11 and the display unit 15 may receive the base unit and so on and transmit the visual information through one touch screen. That is, the input unit 11 may receive from the user a base unit and so on through a touch on a virtual keyboard for typing Chinese character displayed on a touch screen, and the display unit 15 may transmit the visual information to the user through the touch screen.

Hereinafter, by referring to FIGS. 2 and 3, a detailed method of inputting a base unit and so on to the input unit of the Chinese character input apparatus through a keyboard for typing a Chinese character according to embodiments of the present disclosure will be described.

Figure 2:
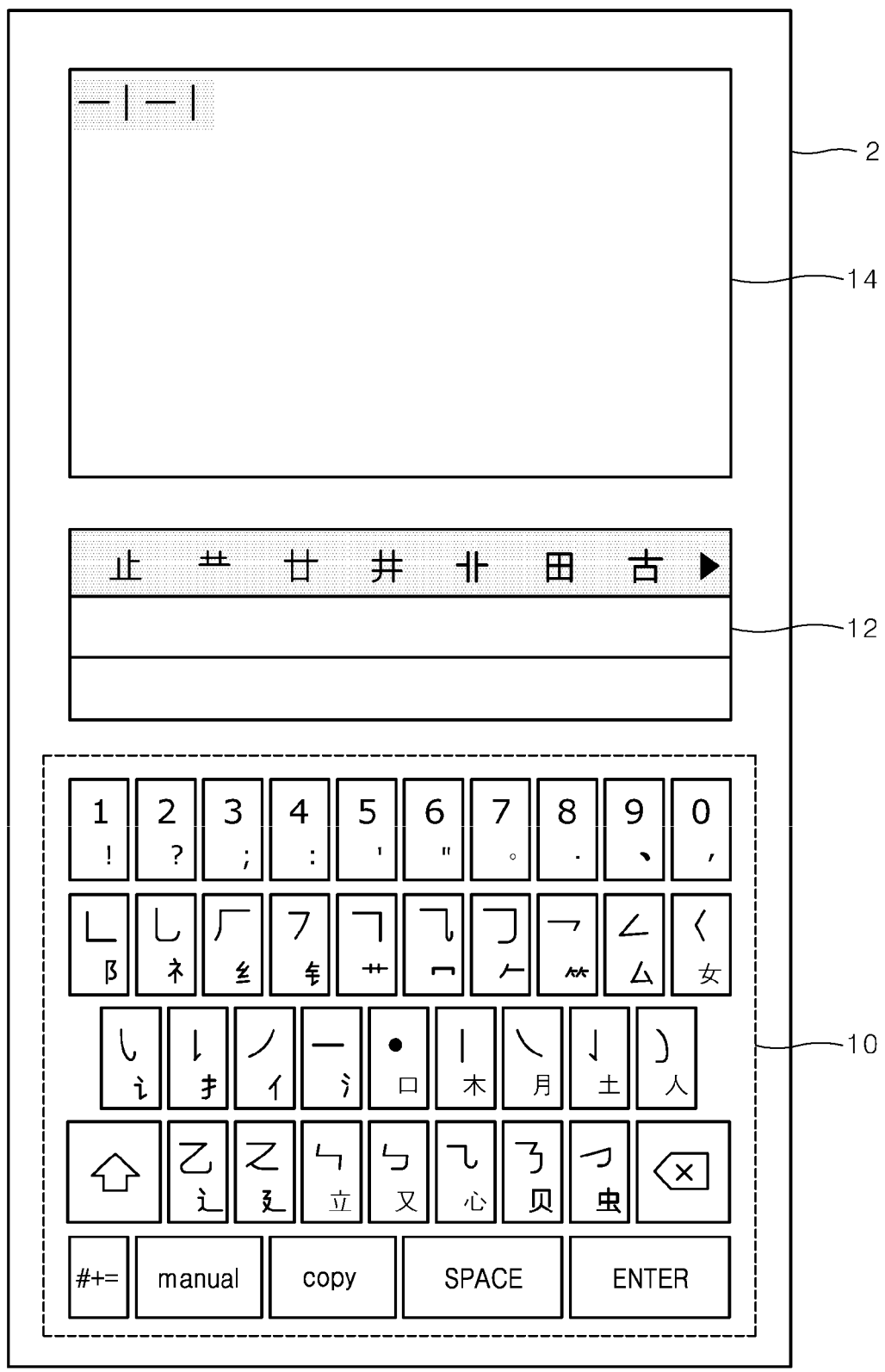
FIG. 2 illustrates an embodiment of a screen of a Chinese character input apparatus which is a smart-phone.

FIG. 2 illustrates an embodiment of a screen of a Chinese character input apparatus.

As described above, the Chinese character input apparatus according to an embodiment of the present disclosure may be a smart-phone, and the screen of the Chinese character input apparatus may be a touch screen included in the smart-phone. At this time, the input unit and the display unit may each receive a base unit and transmit the visual information through one touch screen.

FIG. 2 illustrates an example of the touch screen 2 included in the smart-phone that constitutes the Chinese character input apparatus. In one embodiment of the present disclosure, the touch screen 2 of the Chinese character input apparatus, which is a smart-phone, may display a virtual keyboard 10 for typing Chinese character, a recommendation list window 12, and an input window 14. The user may input a base unit or a basic middle unit in the input unit by touching on the virtual keyboard 10 for typing Chinese character. The display unit may display a base unit, a middle unit, a Chinese character, or a word inputted by the user on the input window 14, and may display, on the recommendation list window 12, a list of recommended middle units, a list of recommended Chinese characters, or a list of recommended words generated by the recommendation list generator.

Referring again to FIG. 2, the virtual keyboard 10 for typing Chinese character may include base unit keys displaying respective base units that the user may input. The user may touch the base unit keys included in the virtual keyboard 10 for typing Chinese character, to input a base unit, while simultaneously confirming the content displayed on the input window 14 and the recommendation list window 12.

Figure 3:
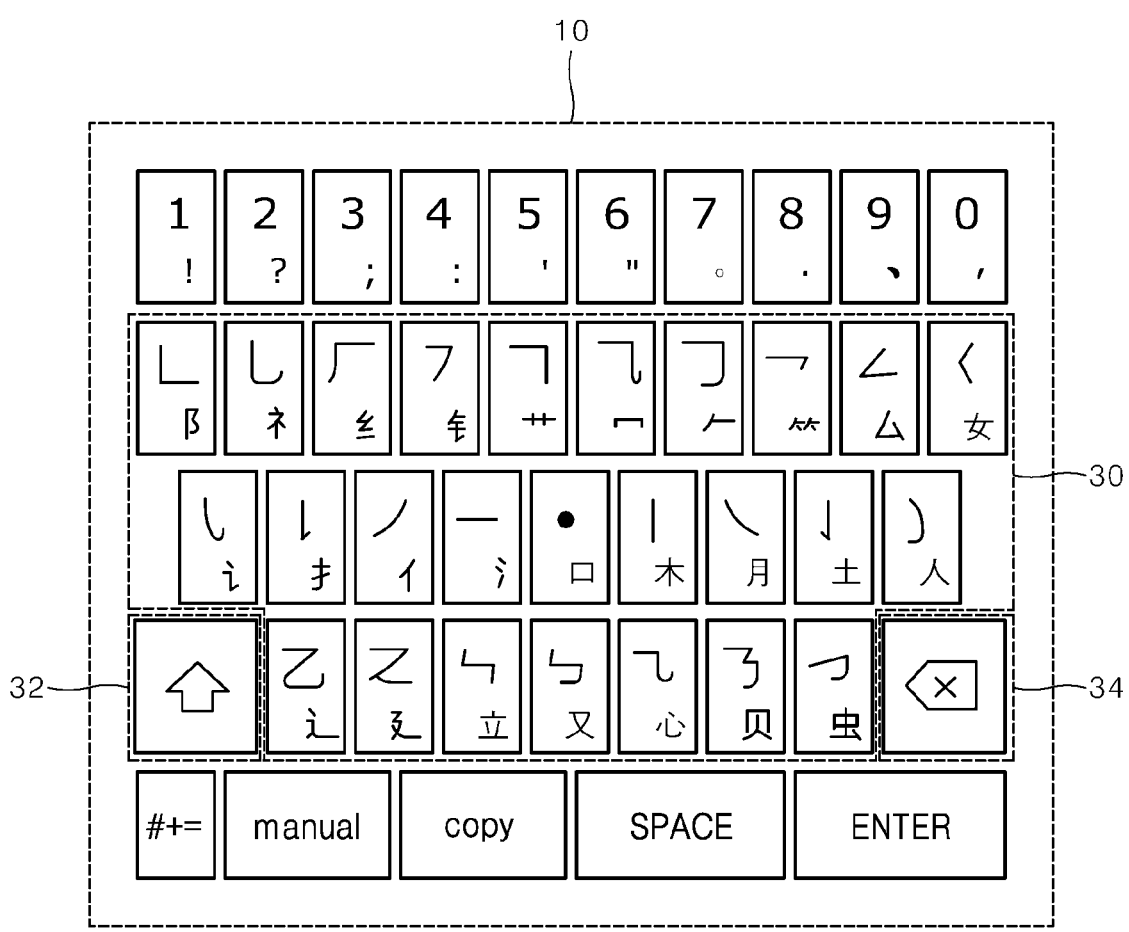
FIG. 3 illustrates an example of a virtual keyboard for typing Chinese character.

FIG. 3 illustrates an example of a virtual keyboard for typing Chinese character.

Referring to FIG. 3, the virtual keyboard 10 for typing Chinese character according to an embodiment of the present disclosure may include a base unit key 30, a switch key 32, and a delete key 34.

The base unit key 30 may be composed of a plurality of keys displaying multiple base units for inputting Chinese characters. That is, the user may press the respective base unit keys 30 to input the base units displayed on the keys to the Chinese character input apparatus.

In an embodiment of the present disclosure, the user may press the base unit key 30 to input a base unit, and may press the delete key 34 to cancel the base unit input.

The user may press the delete key 34 to cancel the input of the middle unit, Chinese character, or word also in the case of having inputted the middle unit, Chinese character, or word is inputted through the list of recommended middle units, the list of recommended Chinese characters, or the list of recommended words, which will be described below.

The arrangement of the base unit keys of the keyboard for typing Chinese character according to the present disclosure will be described in detail below with reference to FIGS. 12 to 18.

Hereinafter, the process at the Chinese character input apparatus for generating a list of recommended middle units based on the base unit or basic middle unit inputted through a keyboard for typing Chinese character of the present disclosure, and receiving a middle unit selected from the list of recommended middle units will be described in detail with reference to the FIGS. 4 to 7.

As described above, when the user inputs a base unit or a basic middle unit to the input unit, the display unit displays on the input window the base unit or basic middle unit inputted by the user. The recommendation list generator generates a list of recommended middle units based on the base unit or the middle unit inputted by the user. Thereafter, the display unit displays a list of recommended middle units generated by the recommendation list generator on the recommendation list window.

Figure 4:
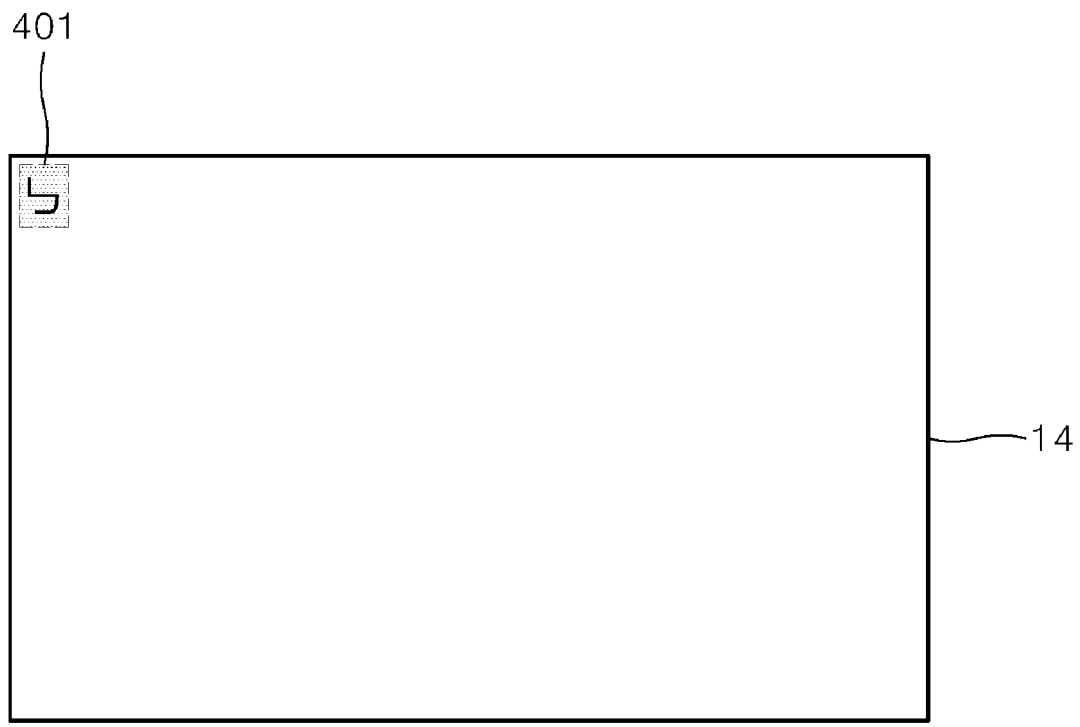
FIG. 4 illustrates an embodiment in which a list of recommended middle units is generated based on a base unit.
Figure 4:
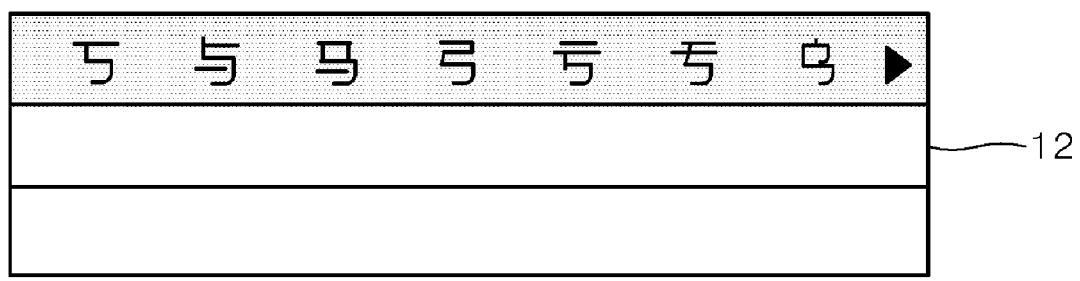

FIG. 4 illustrates an embodiment in which a list of recommended middle units is generated based on a base unit.

The user may input the first base unit 401 to the input unit. The first base unit 401 inputted by the user is displayed on the input window 14. At this time, the recommendation list generator generates a list of recommended middle units, which is a list of the middle units that contains the first base unit 401. In this example, when the middle unit includes the first base unit 401, it means that the middle unit is the one that can be formed by using the first base unit 401 alone or by a combination with one or more other base units. The list of recommended middle units generated by the recommendation list generator is displayed on the recommendation list window 12.

The user may select the middle unit from the list of recommended middle units displayed on the recommendation list window 12 and input the selected middle unit to the input unit.

When the user completes selecting the middle unit, instead of the first base unit 401 displayed previously, a middle unit newly inputted by the user's selecting may be displayed on the input window 14. The selected middle unit displayed on the input window 14 as described above is used for generating a list of recommended Chinese characters to be described below.

In one embodiment of the present disclosure, the user may select the same middle unit multiple times on the recommendation list window 12 and input them consecutively. At this time, the middle unit selected by the user is displayed on the input window 14 by the number of times selected by the user. For example, the user may input same middle unit twice in succession by double-clicking or double-touching the middle unit displayed on the recommendation list window.

Figure 5A:
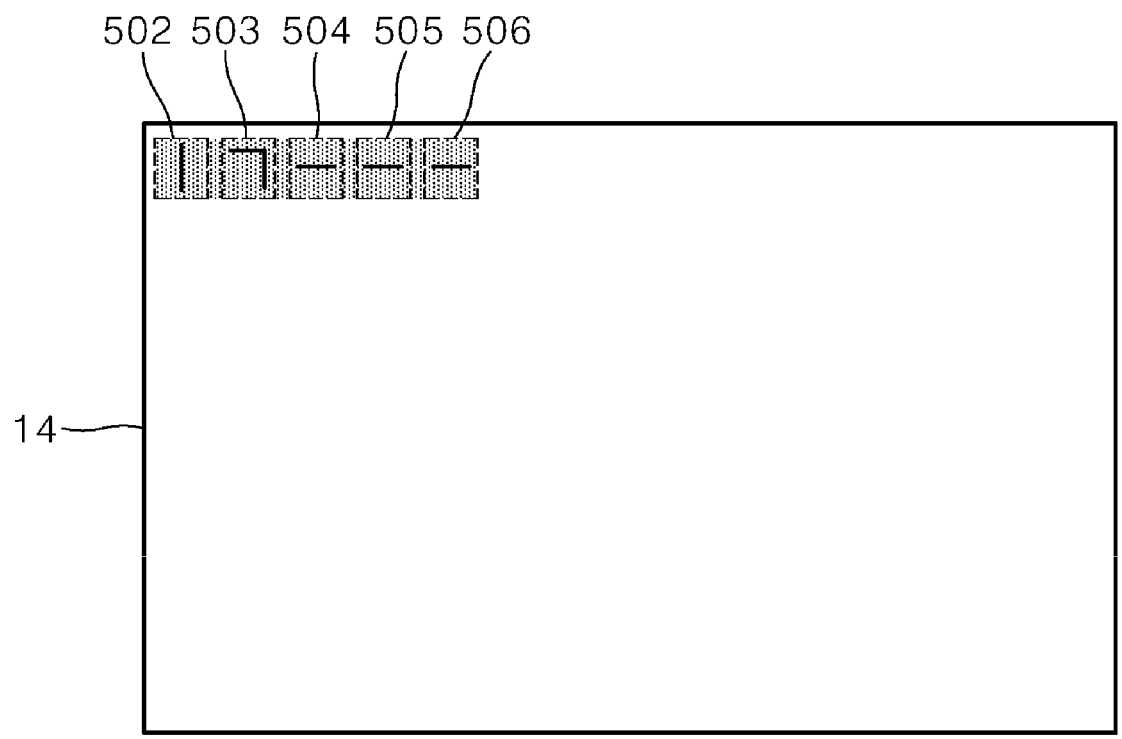
FIG. 5A illustrates an example in which the user inputs a second base unit, a third base unit, a fourth base unit, a fifth base unit and a sixth base unit in order.
Figure 5A:
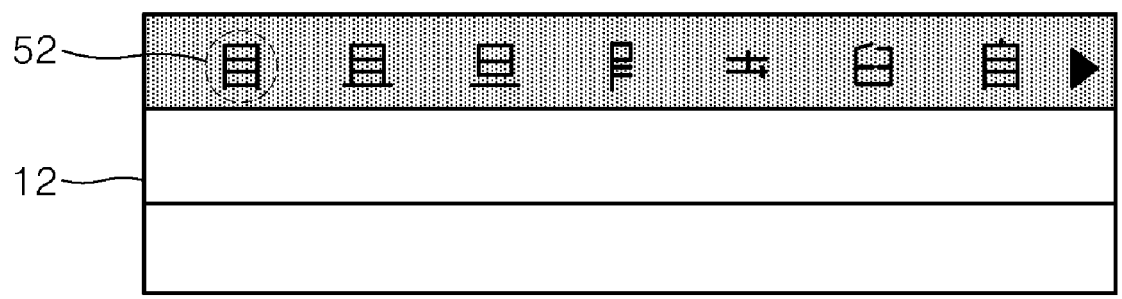
Figure 5B:
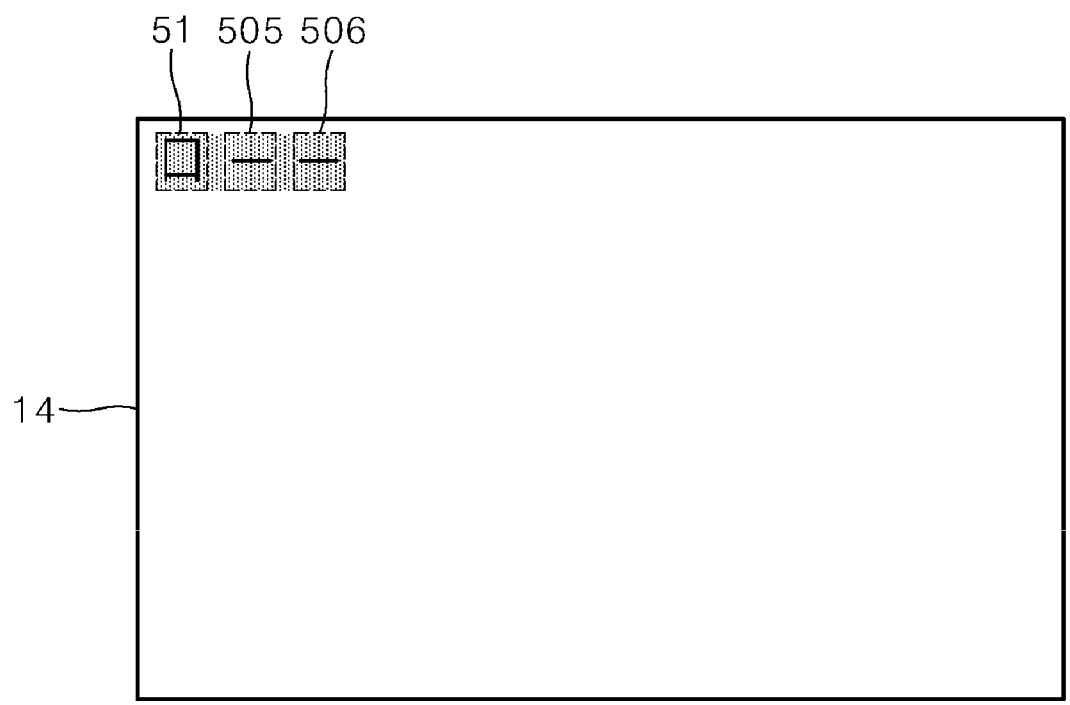
FIG. 5B illustrates an example in which the user inputs the first middle unit, the fifth base unit and the sixth base unit in order.
Figure 5B:
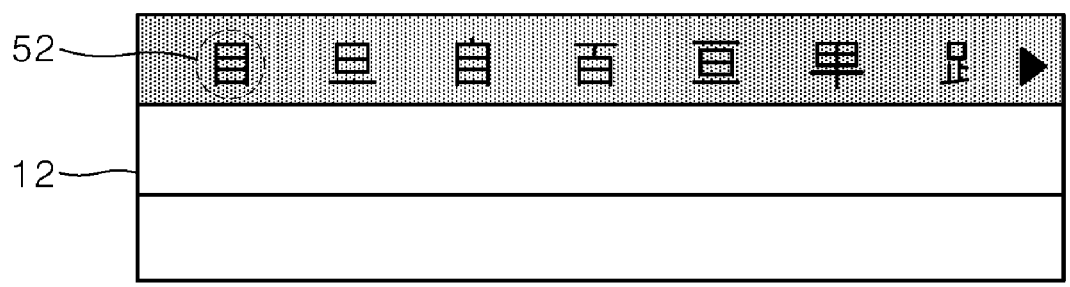

FIGS. 5A and 5B illustrates an embodiment of generating a list of recommended middle units upon direct input of a basic middle unit.

As described above, the user may input a previously-set basic middle unit through the base unit key 30. At this time, a list of recommended middle units composed of one or more middle units including the inputted basic middle unit may be displayed on the recommendation list window 12. That is, the user may directly input the basic middle unit through the base unit key 30, rather than pressing the base unit key 30 multiple times and generating a list of recommended middle units, thereby saving time required for inputting the Chinese character.

FIG. 5A illustrates an example in which the user inputs a second base unit 502, a third base unit 503, a fourth base unit 504, a fifth base unit 505 and a sixth base unit 506 in order. At this time, the second to sixth base units 502 to 506 inputted by the user may be displayed on the input window 14 in the order of input, and a list of recommended middle units composed of one or more middle units including all of the second to sixth base units 502 to 506 may be displayed on the recommendation list window 12. At this time, the list of recommended middle units displayed on the recommendation list window 12 includes the second recommended middle unit 52.

FIG. 5B illustrates an example in which the user inputs the first middle unit 51, the fifth base unit 505 and the sixth base unit 506 in order. In this example, the first middle unit 51 is a basic middle unit that may be generated by a combination of the second base unit 502, the third base unit 503, and the fourth base unit 504 described above. Likewise FIG. 5A, the first middle unit 51, the fifth base unit 505 and the sixth base unit 506 inputted by the user may be displayed on the input window 14 in the order of input, and a list of recommended middle units composed of one or more middle units including all of the first middle unit 51, the fifth base unit 505 and the sixth base unit 506 may be displayed on the recommendation list window 12. At this time, the list of recommended middle units displayed on the recommendation list window 12 includes the second recommended middle unit 52.

When comparing FIGS. 5A and 5B, all of the list of recommended middle units displayed on the recommendation list window 12 include the second recommended middle unit 52. That is, instead of inputting the second base unit 502, the third base unit 503, and the fourth base unit 504, respectively, the user may directly input the first middle unit 51 which may be generated by a combination of the second base unit 502, the third base unit 503, and the fourth base unit 504 to generate the same list of recommended middle units.

As described above, the user may directly input the basic middle unit of the frequently used middle unit, without selecting and inputting the middle unit from the list of recommended middle units generated by a combination of a plurality of base units, thereby saving the time required for inputting the Chinese character.

In one embodiment of the present disclosure, the order of inputting a plurality of base units does not affect the result of the generation of the list of recommended middle units.

Figure 6A:
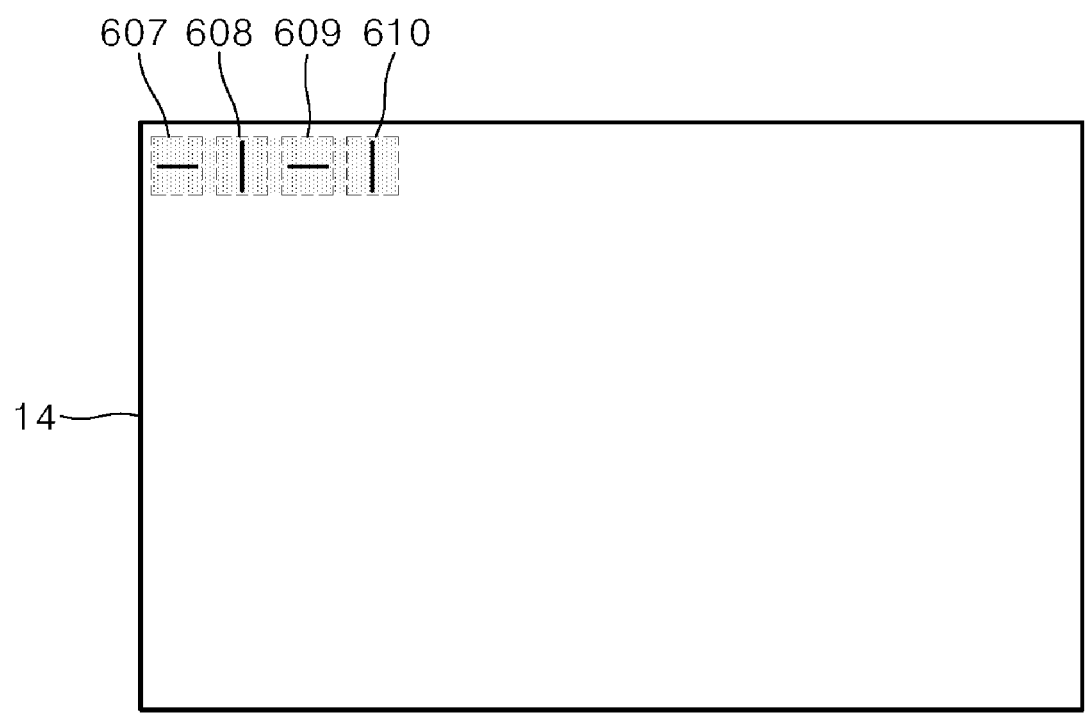
FIG. 6A illustrates an example in which the user inputs a seventh to tenth base units in the order of the seventh base unit, the eighth base unit, the ninth base unit, and the tenth base unit.
Figure 6A:
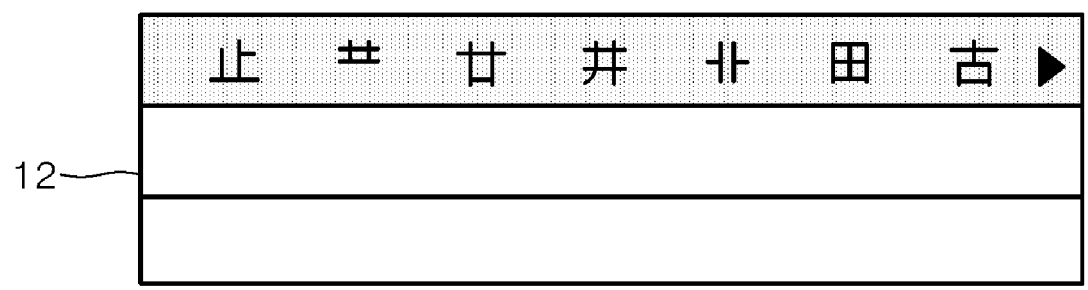
Figure 6B:
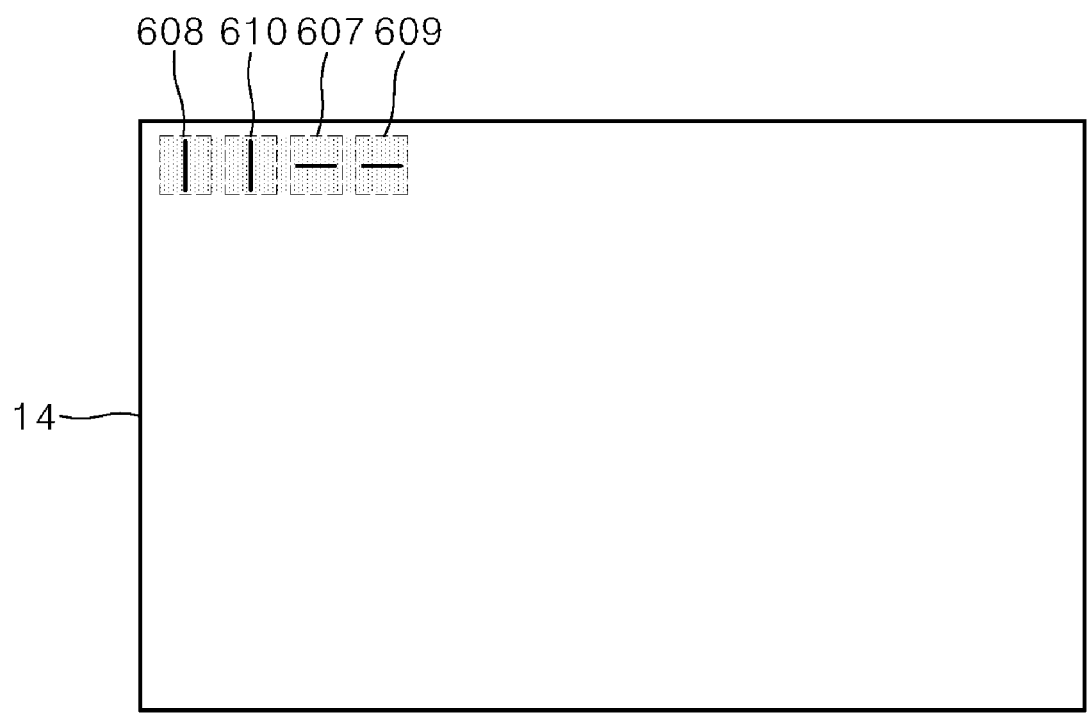
FIG. 6B illustrates an example in which the user inputs the seventh to tenth base units in the order of the eighth base unit, the tenth base unit, the seventh base unit, and the ninth base unit.
Figure 6B:
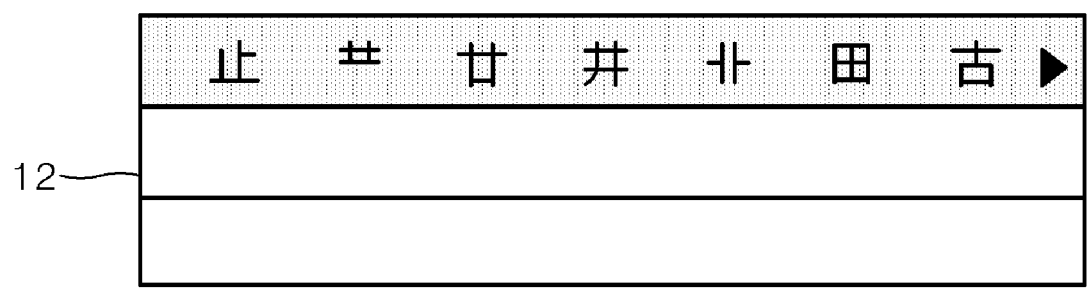

FIGS. 6A and 6B illustrates an embodiment in which an order of inputting a base unit is not taken into consideration in the generation of the list of recommended middle units.

FIG. 6A illustrates an example in which the user inputs a seventh to tenth base units 607 to 610 in the order of the seventh base unit 607, the eighth base unit 608, the ninth base unit 609, and the tenth base unit 610. At this time, the seventh to tenth base units 607 to 610 inputted by the user may be displayed on the input window 14 in the order of input, and a list of recommended middle units composed of one or more middle units including all of the seventh to tenth base units 607 to 610 may be displayed on the recommendation list window 12.

FIG. 6B illustrates an example in which the user inputs the seventh to tenth base units 607 to 610 in the order of the eighth base unit 608, the tenth base unit 610, the seventh base unit 607, and the ninth base unit 609. Likewise FIG. 6A, the seventh to tenth base units 607 to 610 inputted by the user may be displayed on the input window 14 in the order of input, and a list of recommended middle units composed of one or more middle units including all of the seventh to tenth base units 607 to 610 may be displayed on the recommendation list window 12.

When comparing the examples of FIGS. 6A and 6B, both of the examples display the same list of recommended middle units on the recommendation list window 12. That is, the recommendation list generator may always generate the same list of recommended middle units for the same one or more base unit input regardless of the order of inputting the base unit inputted from the user.

As described above, since the base unit is the smallest unit of a Chinese character, the order of inputting the base units has a similar meaning as the order of strokes of a Chinese character. Accordingly, there is an advantage that, when the Chinese character input apparatus receives a base unit through the keyboard for typing Chinese character of the present disclosure, it can always generate the same list of recommended middle units for the same one or more base units inputted in different orders from each other so that even a user who does not know the Chinese character's stroke order may also input Chinese character easily.

In one embodiment of the present disclosure, based on a Chinese character containing all the previously-inputted middle units as well as the middle units that contain one or more currently-inputted base units, the list of recommended middle units displayed on the recommendation list window may be constructed excluding the middle units that are not included in the Chinese character.

Figure 7A:
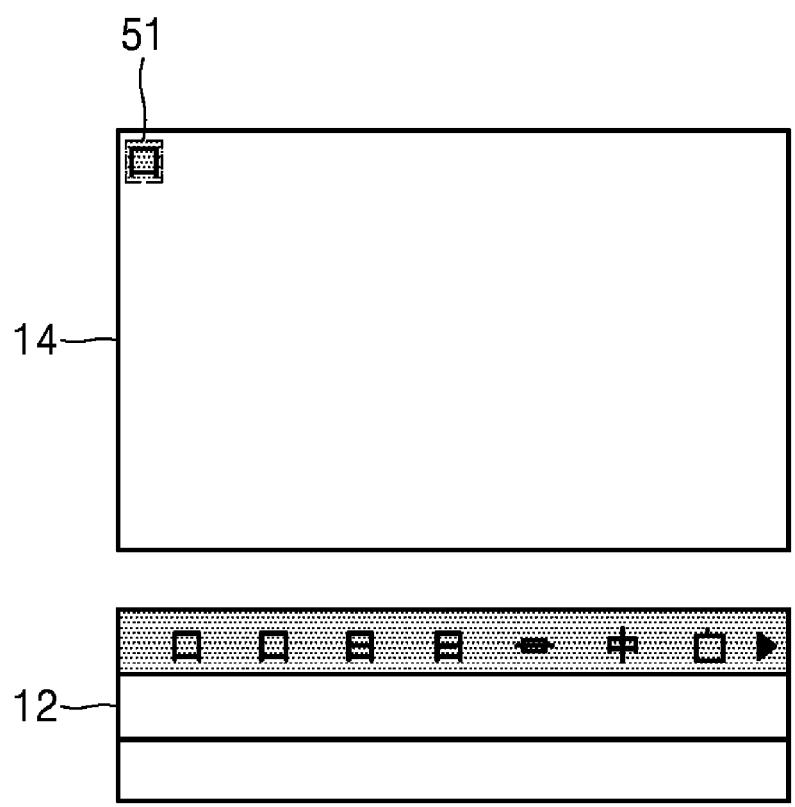
FIG. 7A illustrates an embodiment in which when the user inputs first middle unit, which is a basic middle unit, a list of recommended middle units composed of middle units including the first middle unit is displayed on a recommendation list window.
Figure 7B:
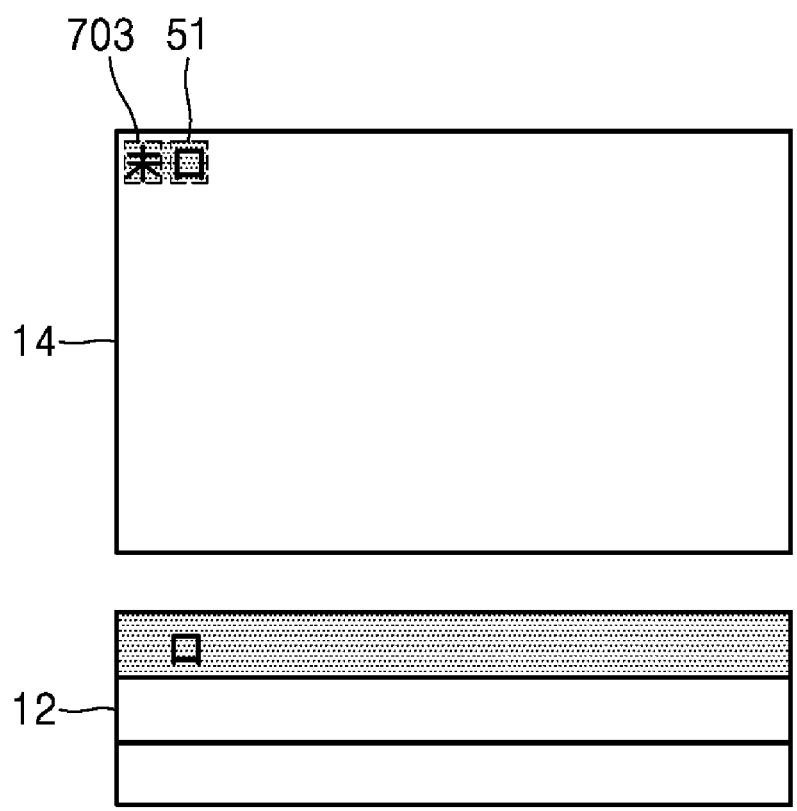
FIG. 7B illustrates an embodiment in which after inputting the third middle unit, the user inputs the first middle unit in a state in which the third middle unit is being displayed on the input window.
Figure 7C:
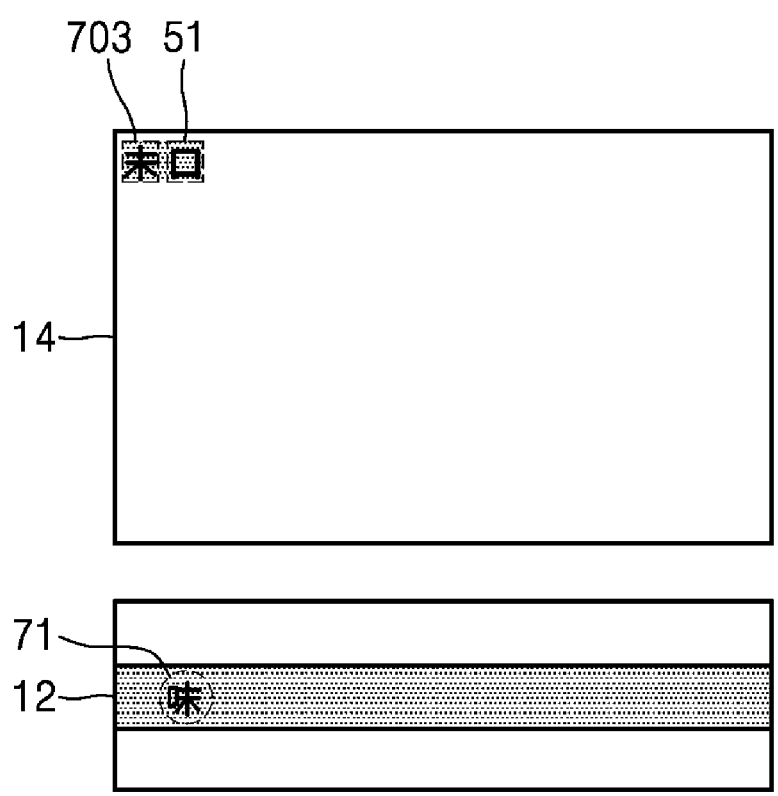
FIG. 7C illustrates an embodiment in which when the user inputs the first middle unit which is the basic middle unit after inputting the third middle unit, a list of recommended middle units composed of middle units except the middle unit not included in the first recommended Chinese character is displayed.

FIGS. 7A, 7B and 7C illustrates an embodiment in which a previously-inputted middle unit is taken into consideration in the generation of a list of recommended middle units.

Referring to FIG. 7A, when a user directly inputs a first middle unit 51, which is a basic middle unit, a list of recommended middle units composed of middle units including the first middle unit 51 may be displayed on a recommendation list window 12. Although not shown in the drawing, as described above with reference to FIG. 5B, the user may input a second base unit 502, a third base unit 503, and a fourth base unit 504 instead of directly inputting the first middle unit 51 to obtain the same list of recommended middle units as when the first middle unit 51 is inputted.

Referring to FIG. 7B, after inputting the third middle unit 703, the user may further input the first middle unit 51 in a state in which the third middle unit 703 is being displayed on the input window 14. At this time, unlike the embodiment of FIG. 7A, the middle unit included in the list of recommended middle units displayed on the recommendation list window 12 is limited to a middle unit that can be combined with the third middle unit 703 to generate a Chinese character. Specifically, the list of recommended middle units generated by the recommendation list generator may be constructed such that middle unit not included in Chinese character is excluded from the list of recommended middle units, based on one or more Chinese characters including all of the previously-inputted third middle unit 703 and the first middle unit 51 as inputted.

For example, referring to FIG. 7C, there is only the first recommended Chinese character 71 present on the database, for a Chinese character that contains both of the third middle unit 703 and the first middle unit 51. Therefore, when the user inputs the first middle unit 51 which is the basic middle unit after inputting the third middle unit 703, as in the embodiment of FIG. 7A, a list of recommended middle units composed of middle units except the middle unit not included in the first recommended Chinese character 71 may be displayed, rather than displaying on the recommendation list window 12 all the recommended middle units that contain the first middle unit 51.

That is, since the recommendation list generator of the present disclosure provides the list of recommended middle units generated in consideration of the already-inputted middle units, there is an advantage that it is enabled to prevent a plurality of middle units, which may not generate a Chinese character in combination, from being inputted, so that the speed of inputting the Chinese character can be increased.

Hereinafter, the process at the Chinese character input apparatus for generating a list of recommended Chinese characters based on a middle unit inputted through the keyboard for typing Chinese character of the present disclosure, and receiving a Chinese character selected from the list of recommended Chinese characters will be described in detail with reference to the FIGS. 8 and 9.

As described above, when the user inputs a middle unit into the input unit, the display unit displays the middle unit inputted by the user on the input window. The recommendation list generator generates a list of recommended Chinese characters based on the middle units received from the user. Thereafter, the display unit displays a list of recommended Chinese characters generated by the recommendation list generator on the recommendation list window.

Figure 8:
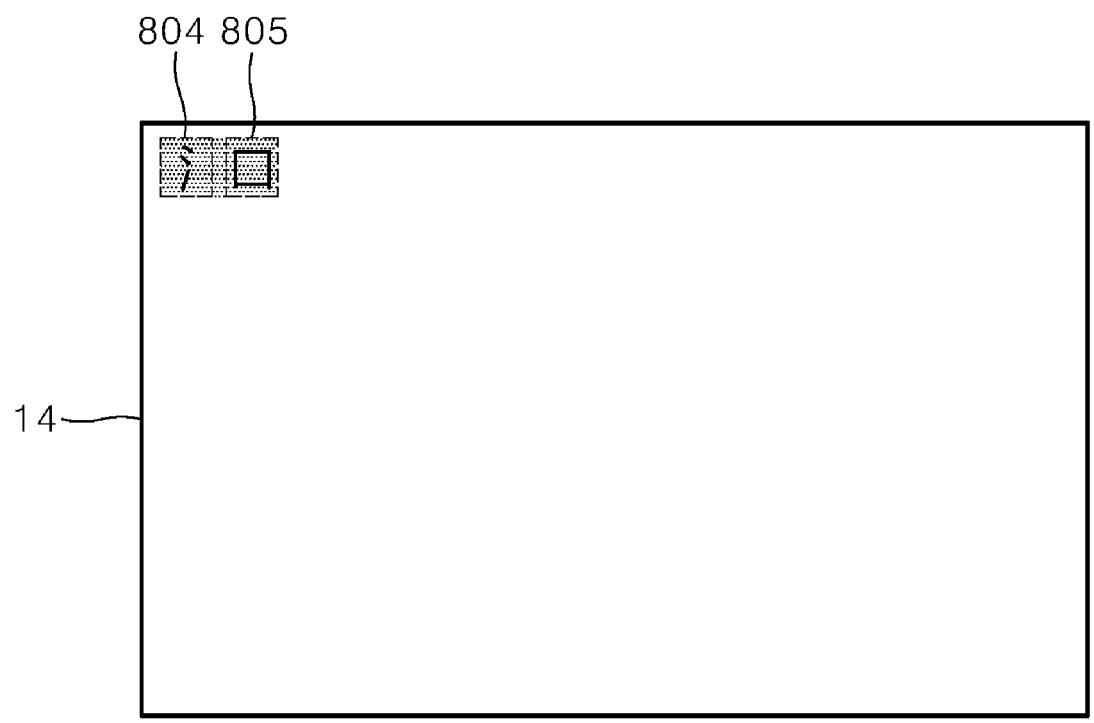
FIG. 8 illustrates an embodiment in which a list of recommended Chinese characters is generated based on a middle unit.
Figure 8:
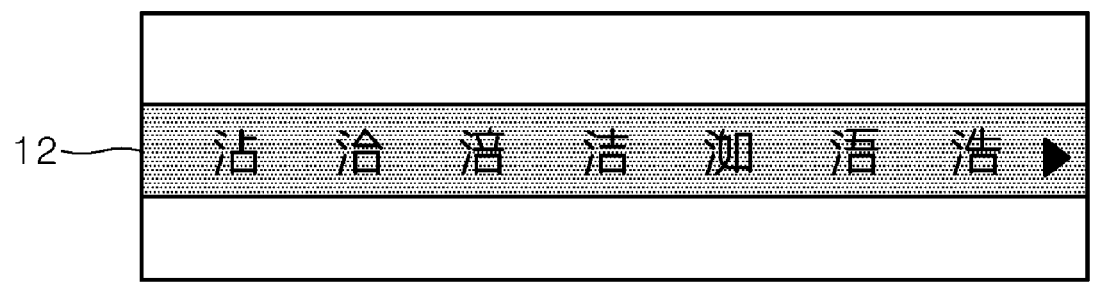

FIG. 8 illustrates an embodiment in which a list of recommended Chinese characters is generated based on a middle unit.

The user may input the fourth middle unit 804 and the fifth middle unit 805 to the input unit. At this time, the recommendation list generator generates a list of recommended Chinese characters composed of one or more Chinese characters that contain both of the fourth middle unit 804 and the fifth middle unit 805. In this example, by the statement "Chinese character including both of the fourth middle unit 804 and the fifth middle unit 805", it means a Chinese character that can be constructed with only the fourth middle unit 804 and the fifth middle unit 805, or by a combination of the fourth middle unit 804 and the fifth middle unit 805 with one or more other middle units. The list of recommended Chinese characters generated by the recommendation list generator is displayed on the recommendation list window 12.

The user may select the Chinese character from the list of recommended Chinese characters displayed on the recommendation list window 12 and input the selected Chinese character to the input unit.

When the user completes selecting the Chinese character, instead of the fourth middle unit 804 and the fifth middle unit 805 displayed previously, a Chinese character newly inputted by the user's selecting may be displayed on the input window 14. The selected Chinese character displayed on the input window 14 as described above is used for generating a list of recommended words which will be described below.

In one embodiment of the present disclosure, the user may select the same Chinese character multiple times on the recommendation list window 12 and input them consecutively. At this time, the Chinese character selected by the user is displayed on the input window 14 by the number of times selected by the user. For example, a user may input the same Chinese character twice in succession by double-clicking or double-touching the Chinese character displayed on the recommendation list window.

In one embodiment of the present disclosure, the order of inputting a plurality of middle units does not affect the result of generating the list of recommended Chinese characters.

Figure 9A:
FIG. 9A illustrates an example in which the user inputs the sixth middle unit and the seventh middle unit in the order of the sixth middle unit and the seventh middle unit.
Figure 9A:
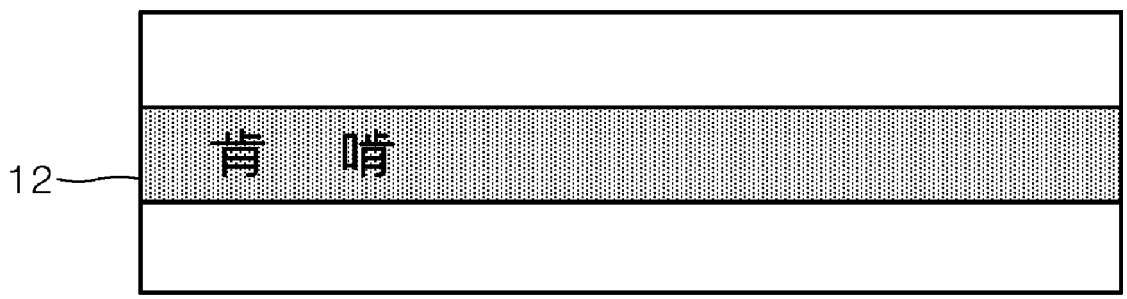
Figure 9B:
FIG. 9B illustrates an example in which the user inputs the sixth middle unit and the seventh middle unit in the order of the seventh middle unit and the sixth middle unit.
Figure 9B:
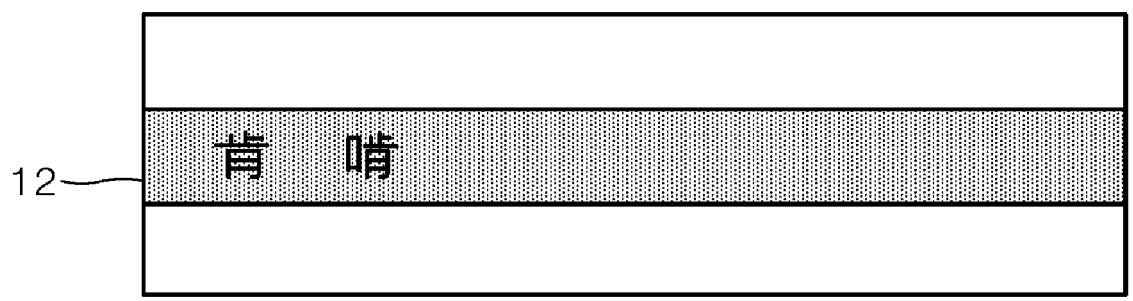

FIGS. 9A and 9B illustrates an embodiment in which an order of inputting a middle unit is not taken into consideration in the generation of the list of recommended Chinese character.

FIG. 9A illustrates an example in which the user inputs the sixth middle unit 906 and the seventh middle unit 907 in the order of the sixth middle unit 906 and the seventh middle unit 907. At this time, the sixth middle unit 906 and the seventh middle unit 907 inputted by the user may be displayed on the input window 14 in the order of input and a list of recommended Chinese characters composed of one or more Chinese characters that contain both of the sixth middle unit 906 and the seventh middle unit 907 may be displayed on the recommendation list window 12.

FIG. 9B illustrates an example in which the user inputs the sixth middle unit 906 and the seventh middle unit 907 in the order of the seventh middle unit 907 and the sixth middle unit 906. Likewise FIG. 9A, the sixth middle unit 906 and the seventh middle unit 907 inputted by the user may be displayed on the input window 14 in the order of input, and a list of recommended Chinese characters composed of one or more Chinese character including both of the sixth middle unit 906 and the seventh middle unit 907 may be displayed on the recommendation list window 12.

When comparing the examples of FIGS. 9A and 9B, both of the examples display the same list of recommended Chinese characters on the recommendation list window 12. That is, the recommendation list generator may always generate the same list of recommended Chinese characters for the same one or more middle units being inputted, regardless of the order of inputting the middle units inputted from the user.

That is, the recommendation list generator of the present disclosure has an advantage that it can always generate the same list of recommended Chinese characters for the same one or more middle units inputted in different orders from each other so that even a user who does not know the Chinese character's stroke order may also input Chinese character easily.

Hereinafter, the process at the Chinese character input apparatus of the present disclosure for generating a list of recommended words based on a Chinese character inputted through the keyboard for typing Chinese character of the present disclosure, and receiving a word selected from the list of recommended words will be described in detail with reference to the FIG. 10.

As described above, when the user inputs a Chinese character into the input unit, the display unit displays the Chinese character inputted by the user on the input window. The recommendation list generator generates a list of recommended words based on the Chinese character received from the user. Thereafter, the display unit displays a list of recommended words generated by the recommendation list generator on the recommendation list window.

Figure 10:
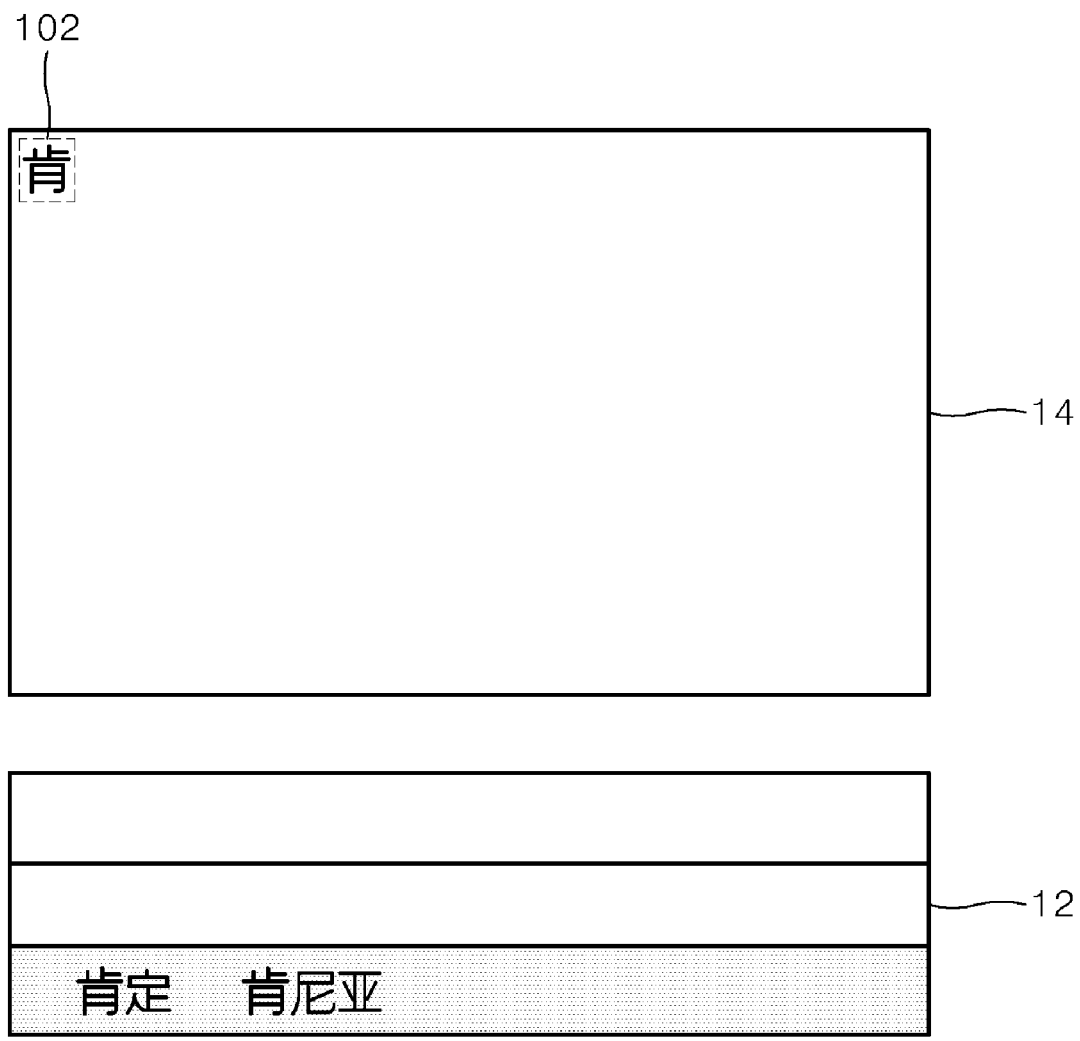
FIG. 10 illustrates an embodiment in which a list of recommended words is generated based on a Chinese character.

FIG. 10 illustrates an embodiment in which a list of recommended words is generated based on a Chinese character.

The user may input a second Chinese character 102 to the input unit. The second Chinese character 102 inputted by the user is displayed on the input window 14. At this time, the recommendation list generator generates a list of recommended words composed of one or more words that contain the second Chinese character 102. In this example, when the word includes the second Chinese character 102, it means that the word is the one that can be generated by combining the second Chinese character 102 with one or more other Chinese characters. The list of recommended words generated by the recommendation list generator is displayed on the recommendation list window 12.

The user may select the word from the list of recommended words displayed on the recommendation list window 12 and input the selected word to the input unit.

When the user completes selecting the word, instead of the second Chinese character 102 displayed previously, a word newly inputted by the user's selecting may be displayed on the input window 14.

In one embodiment of the present disclosure, the user may select the same word multiple times on the recommendation list window 12 and input them consecutively. At this time, the word selected by the user is displayed on the input window 14 by the number of times selected by the user. For example, a user may input the same word twice in succession by double-clicking or double-touching the word displayed on the recommendation list window.

In one embodiment of the present disclosure, a base unit or middle unit failed to be formed into a complete Chinese character may be displayed on the input window 14, distinctively from the completed Chinese character.

Figure 11:
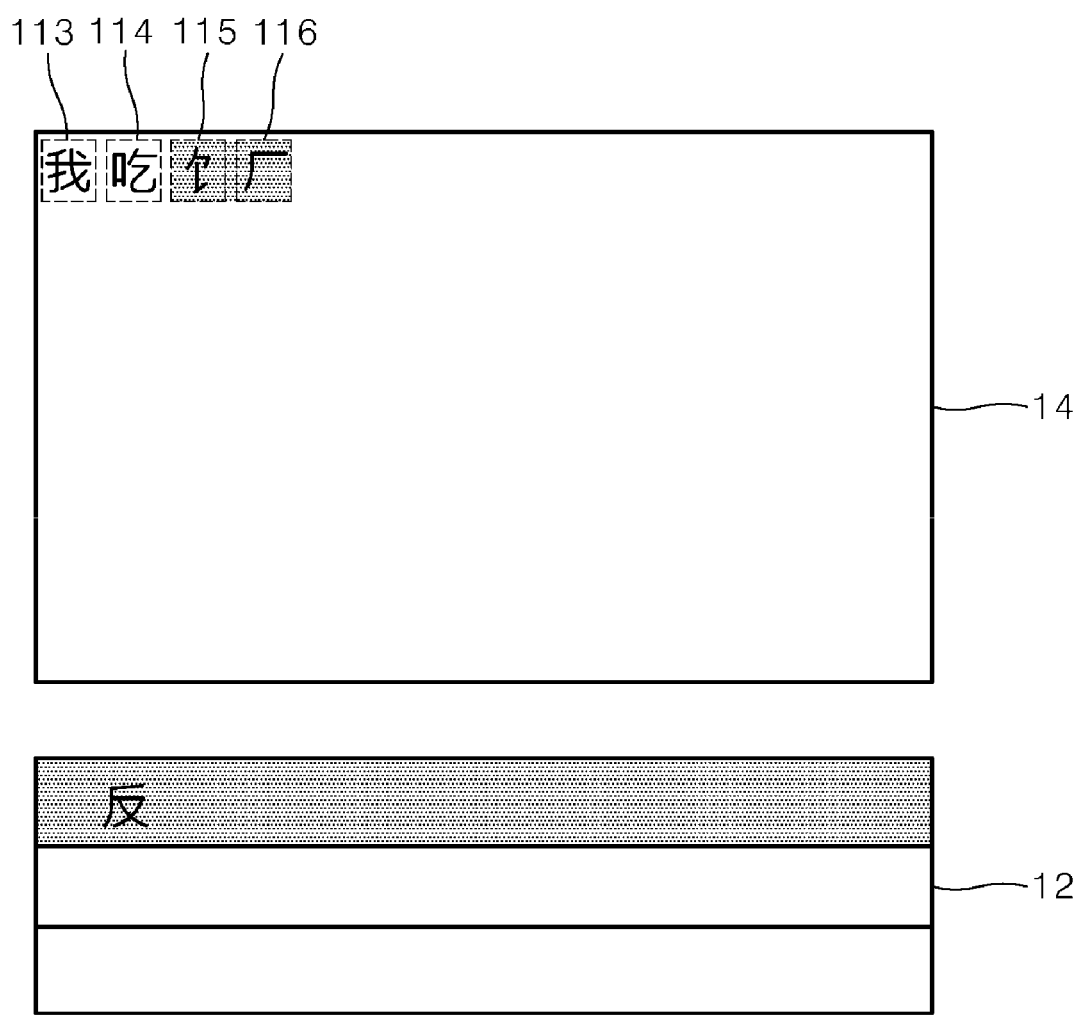
FIG. 11 illustrates an embodiment showing indication of a complete state and incomplete state of a Chinese character.

FIG. 11 illustrates an embodiment showing indication of a complete state and incomplete state of a Chinese character.

In the present disclosure, the complete state of the Chinese character means a state in which the Chinese character selected from the list of recommended Chinese characters by the user is displayed on the input window. Conversely, the incomplete state of the Chinese character means a state in which one or more base units or middle units are displayed on the input window before selecting of the Chinese character by the user from the list of recommended Chinese characters.

For example, referring to FIG. 11, the user may further input the eighth middle unit 115 and the eleventh base unit 116 in the state in which the third Chinese character 113 and the fourth Chinese character 114 are inputted to the input unit. First, the third Chinese character 113 and the fourth Chinese character 114 inputted previously may be displayed on the input window 14 together with the eighth middle unit 115 and the eleventh base unit 116. At this time, the eighth middle unit 115 and the eleventh base unit 116 may be displayed on the input window 14 with shading to be distinguished from the third Chinese character 113 and the fourth Chinese character 114 which are previously inputted.

Referring again to FIG. 11, as described above, when the eighth middle unit 115 and the eleventh base unit 116 are further inputted, regardless of the third Chinese character 113 and the fourth Chinese character 114, a list of recommended middle units composed of one or more middle unit that contain both of the eighth middle unit 115 and the eleventh base unit 116 is displayed on the recommendation list window 12.

Therefore, since the user of the Chinese character input apparatus is able to distinguish and identify the base unit or the middle unit to construct a new Chinese character intended to be inputted from the previously-inputted Chinese character, it is possible to input the Chinese character accurately and quickly.

Hereinafter, a keyboard for typing Chinese character capable of inputting base units or middle units to the Chinese character input apparatus will be described in detail with reference to FIGS. 12 to 18.

As described above, in one embodiment of the present disclosure, the Chinese character input apparatus may include a computer. In this example, the input unit may receive a base unit or a middle unit through typing by a user on a keyboard for typing Chinese character connected to a computer. That is, the keyboard for typing Chinese character of the present disclosure may include a real keyboard.

Meanwhile, in one embodiment of the present disclosure, the Chinese character input apparatus may be a smart-phone or a tablet PC. In this example, the input unit may receive the base unit or the middle unit through a touch screen. That is, the keyboard for typing Chinese character of the present disclosure may be a virtual keyboard displayed on a touch screen of a smart-phone or a tablet PC provided as a Chinese character input apparatus.

Figure 12:
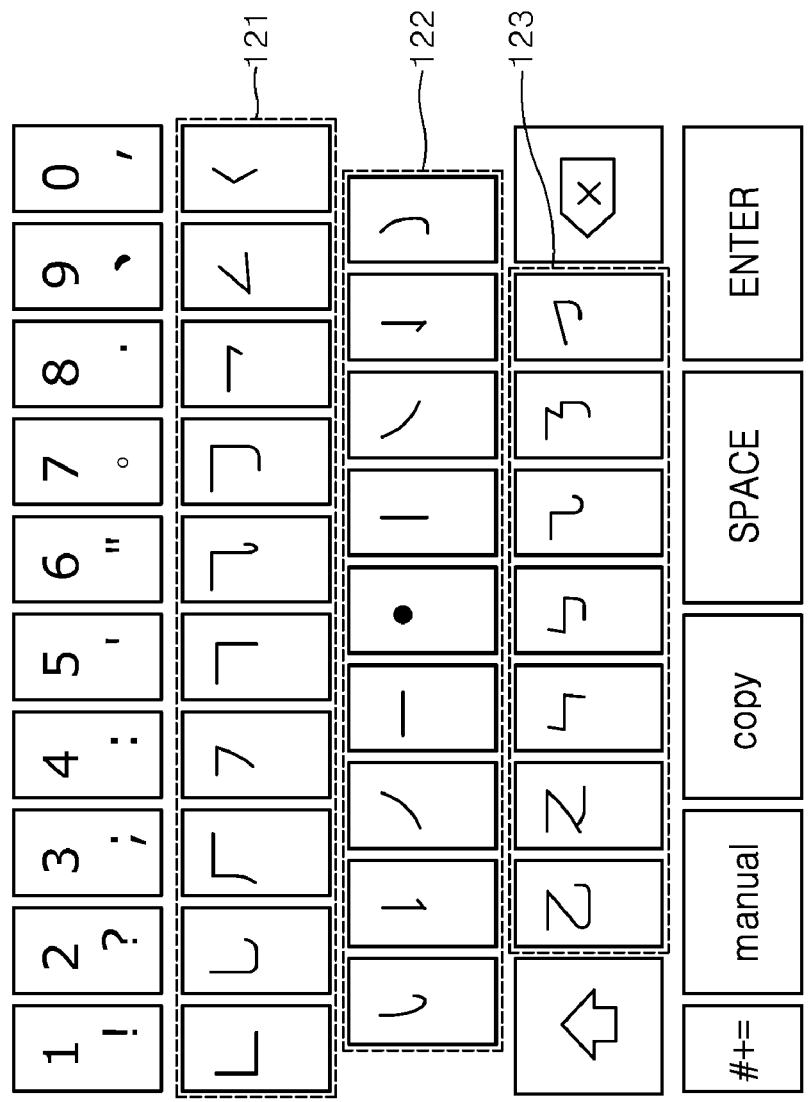
FIG. 12 illustrates an arrangement of base unit keys of a keyboard for typing Chinese character according to an embodiment of the present disclosure.

FIG. 12 illustrates an arrangement of base unit keys of a keyboard for typing Chinese character according to an embodiment of the present disclosure.

Referring to FIG. 12, the keyboard for typing Chinese character of the present disclosure includes a first base unit key group 121 including subgroups of base unit keys having similar shapes to each other, a second base unit key group 122 including base unit keys having symmetrical shapes with each other, and a third base unit key group 123 including subgroups of base unit keys which are different from the base unit keys included in the first base unit key group 121 and having similar shapes to each other.

In an embodiment of the present disclosure, the first base unit key group 121 may be disposed in a first row, which is an upper part of the keyboard for typing Chinese character, the second base unit key group 122 may be disposed in a second row, which is the middle part of the keyboard for typing Chinese character, and the third base unit key group 123 may be disposed in a third row, which is a lower part of the keyboard.

Referring again to FIG. 12, in an embodiment of the present disclosure, the first base unit key group 121 may include ㄴ, ㄴ, ㄱ, 7, ㄱ, ㄱ, ㄱ, ㅡ, ㄥ and 〈 base unit keys, and the third base unit key group 123 may include ㄷ, ㄷ, ㄴ, ㄴ, ㄴ, ㅈ and ㅈ base unit keys.

As described above, the keyboard for typing Chinese character of the present disclosure includes a plurality of base unit keys for displaying base units that do not use the pronunciation of Chinese character, such that it is advantageous that, even when the user does not know the correct pronunciation of the Chinese character, the user may quickly and easily input Chinese character using the base units.

Figure 13:
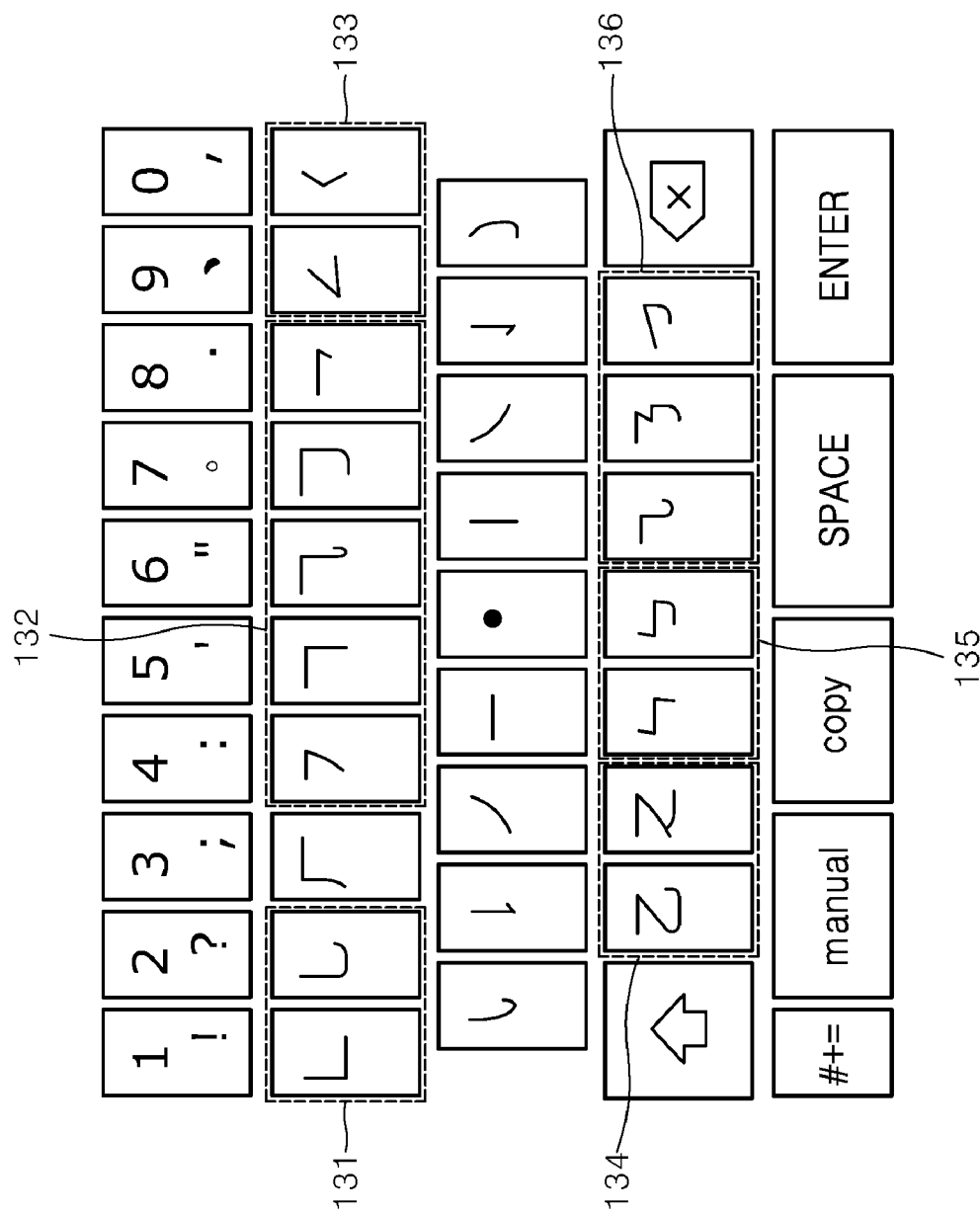
FIG. 13 illustrates an arrangement of the base unit keys included in the first to sixth base unit key subgroups according to an embodiment of the present disclosure.

FIG. 13 illustrates an arrangement of the base unit keys included in the first to sixth base unit key subgroups according to an embodiment of the present disclosure.

In an embodiment of the present disclosure, the subgroups included in the first base unit key group 121 may include a first base unit key subgroup 131 including ㄴ and ㄴ base unit keys, a second base unit key subgroup 132 including 7, ㄱ, ㄱ, ㄱ and ㅡ base unit keys, and a third base unit key subgroup 133 including ㄥ and 〈 base unit keys.

Referring again to FIG. 13, the base unit keys included in the first to the third base unit key subgroups 131 to 133 may be disposed in the first row, which is the upper part of the keyboard for typing Chinese character. In this example, the base unit keys belonging to each base unit key subgroup may be disposed adjacent to each other.

For example, the ㄴ and ㄴ base unit keys belonging to the first base unit key subgroup 131 may be disposed adjacent to each other in the left side of the first row of the keyboard for typing Chinese characters. Likewise, the 7, ㄱ, ㄱ, ㄱ and ㅡ base unit keys belonging to the second base unit key subgroup 132 may be disposed in the middle part of the first row of the keyboard for typing Chinese character, and the ㄥ and 〈 base unit keys belonging to the third base unit key subgroup 133 may be disposed in the right side of the first row of the keyboard for typing Chinese character.

In an embodiment of the present disclosure, the subgroups included in the third base unit key group 123 may include a fourth base unit key subgroup 134 including ㄷ and ㄷ base unit keys, a fifth base unit key subgroup 135 including ㄴ and ㄴ base unit keys, and a sixth base unit key subgroup 136 including ㄴ, ㄴ and ㅈ base unit keys.

As described above, the base unit keys included in the first base unit key group 121 and the third base unit key group 123 may include base unit keys having different shapes from each other.

Referring again to FIG. 13, the base unit keys included in the fourth to sixth base unit key subgroups 134 to 136 may be disposed in the third row of the keyboard. At this time, the base unit keys belonging to each base unit key subgroup may be disposed adjacent to each other.

For example, the ㄷ and ㄷ base unit keys belonging to the fourth base unit key subgroup 134 may be disposed adjacent to each other in the left side of the third row of the keyboard. Similarly, the ㄴ and ㄴ base unit keys belonging to the fifth base unit key subgroup 135 may be disposed in the middle part of the third row of the keyboard, and the ㄴ, ㄴ and ㅈ base unit keys belonging to the sixth base unit key subgroup 136 may be disposed in the right side of the third row of the keyboard.

As described above, the keyboard for typing Chinese character according to the present disclosure has an advantage that the user may easily recognize and memorize the position of each base unit key, since the base unit keys of the base units having similar shapes to each other are grouped into the respective subgroups and arranged adjacent to each other.

Figure 14:
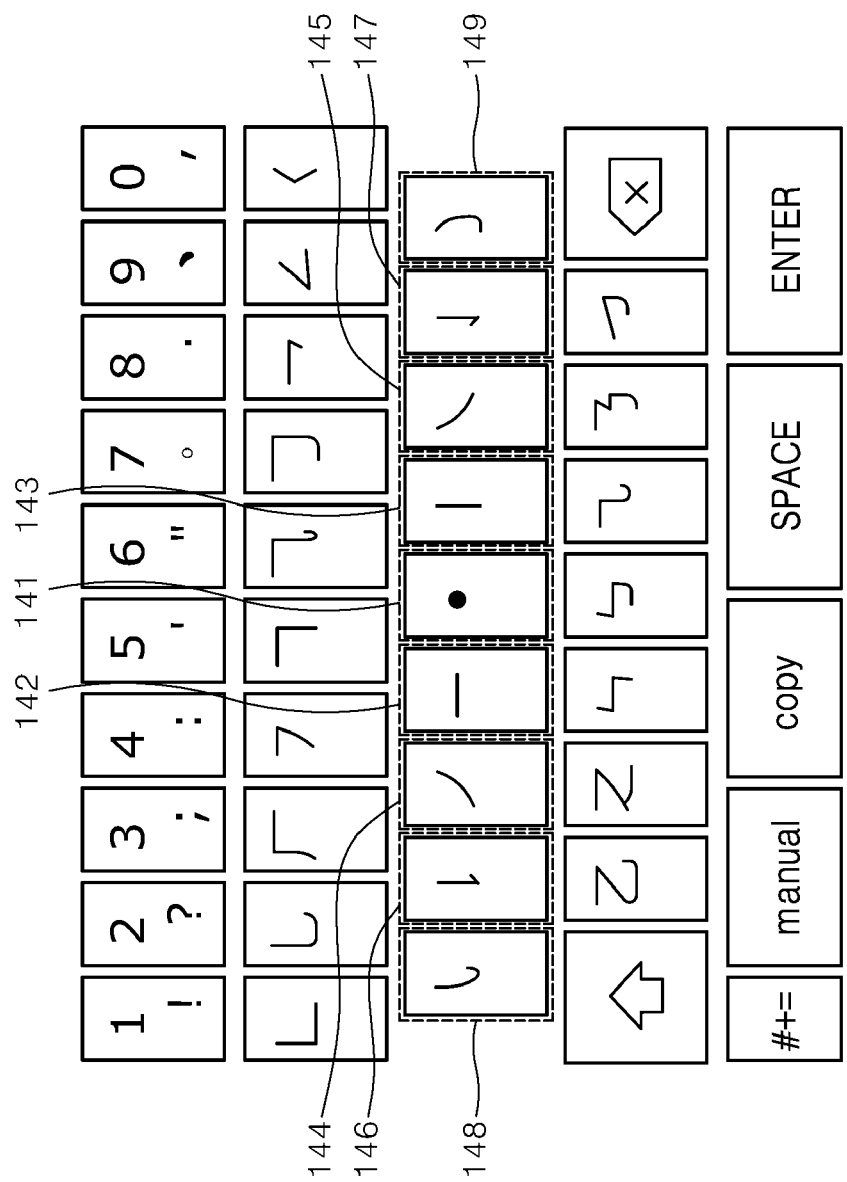
FIG. 14 illustrates an arrangement of the base unit keys included in the second base unit key subgroup according to an embodiment of the present disclosure.

FIG. 14 illustrates an arrangement of the base unit keys included in the second base unit key subgroup according to an embodiment of the present disclosure.

In an embodiment of the present disclosure, the second base unit key group 122 may include ㄴ, ㅣ, ╱, ─, *, ㅣ, ╲, ㅣ and ) base unit keys.

In an embodiment of the present disclosure, the * base unit key 141 included in the second base unit key group 122 is disposed at a center of the second base unit key group 122 and two or more base unit keys in shapes in point symmetry or line symmetry with each other about the * base unit key 141, may be disposed on the left and right sides of the * base unit key 141, respectively.

Referring to FIG. 14, the base unit key included in the second base unit key group 122 may be disposed in the second row of the keyboard for typing Chinese character of the present disclosure. The * base unit key 141 may be positioned at the center of the second row, which is the center of the second base unit key group 122. In this example, among the base unit keys belonging to the second base unit key group 122, shapes of the base units displayed in the base unit keys except for the * base unit key 141 may be symmetrical about the * base unit key 141.

For example, the ─ base unit key 142 is symmetric with the │ base unit key 143 about the * base unit key 141. At this time, as shown in FIG. 14, the ─ base unit key 142 may be disposed in the first position left to the * base unit key 141, and the │ base unit key 143 may be disposed in the first position right to the * base unit key 141.

As another example, the ╱ base unit key 144 is symmetric with the ╲ base unit key 145 about the * base unit key 141. At this time, the ╱ base unit key 144 may be disposed in the second position left to the * base unit key 141, and the ╲ base unit key 145 may be disposed in the second position right to the * base unit key 141. The rest ㅣ, ㅣ, ㄴ and ) base unit keys 146, 147, 148, 149 included in the second base unit key group may also be disposed in the same manner.

As described above, the keyboard for typing Chinese character of the present disclosure has the advantage that the user may easily and quickly memorize the position of each base unit key since the base unit keys having shapes symmetrical with each other are disposed symmetrically on the keyboard.

Figure 15:
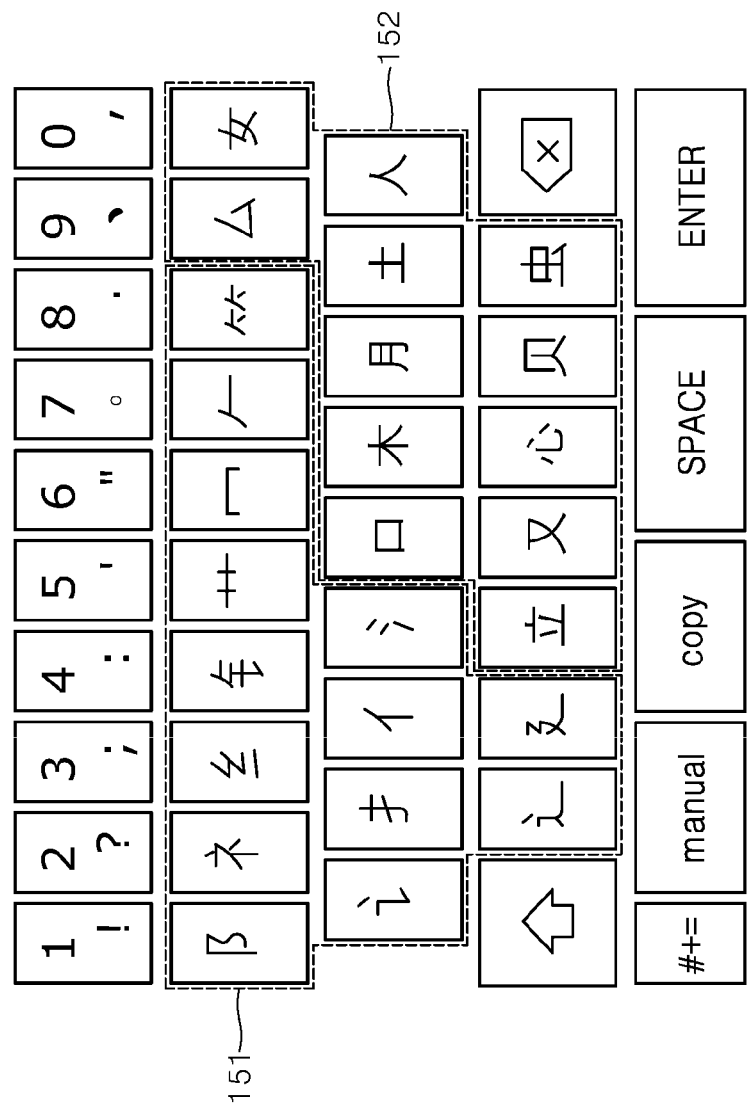
FIG. 15 illustrates an arrangement of a plurality of middle unit keys of a keyboard for typing Chinese character according to an embodiment of the present disclosure.

FIG. 15 illustrates an arrangement of a plurality of basic middle unit keys of a keyboard for typing Chinese character according to an embodiment of the present disclosure.

Referring to FIG. 15, the keyboard for typing Chinese character has a first basic middle unit key group 151 including subgroups of basic middle unit keys having a frequency of use equal to or higher than a preset frequency of use and having the same position in the Chinese character, and a second basic middle unit key group 152 including basic middle unit keys having a frequency of use equal to or higher than a preset frequency of use.

Referring to FIG. 15, a plurality of basic middle unit keys are divided and grouped into a first basic middle unit key group 151 and a second basic middle unit key group 152.

In an embodiment of the present disclosure, the first basic middle unit key group 151 may include 阝, 扌, 纟, 钅, 亻, 氵, 忄, 冫, 艹, 冖, 广, 竹, 廴 and 辶 having a frequency of use equal to or higher than a preset frequency of use. The arrangement of each subgroups belonging to the first basic middle unit key group 151 will be described below with reference to FIG. 16.

In an embodiment of the present disclosure, the second basic middle unit key group 152 may include 厶, 女, 口, 木, 月, 土, 人, 立, 又, 心, 贝 and 生 basic middle unit keys having a frequency of use equal to or higher than a preset frequency of use.

In an embodiment of the present disclosure, the second basic middle unit key group 152 may include a fourth basic middle unit key subgroup including a plurality of basic middle unit keys having the highest frequency of use among the basic middle unit keys belonging to the second basic middle unit key group 152.

For example, the fourth basic middle unit key subgroup may include 口, 木, 月, 土 and 人 middle unit keys having the highest frequency of use among the 厶, 女, 口, 木, 月, 土, 人, 立, 又, 心, 贝 and 生 basic middle unit keys included the second basic middle unit key group 152.

Referring again to FIG. 15, the 口, 木, 月, 土 and 人 middle unit keys included in the fourth basic middle unit key subgroup may be disposed in the second row of the keyboard for typing Chinese character of the present disclosure.

That is, the user may save the time required for Chinese character input as he/she may directly input a middle unit frequently used for Chinese character input to the Chinese character input apparatus using the basic middle unit keys included in the second basic character type key group 152.

In addition, the keyboard for typing Chinese character according to the present disclosure has an advantage that the user can memorize the positions of the frequently used middle units easily and quickly, since the basic middle unit keys having the highest frequency of use among the basic middle unit keys having a frequency of use equal to or higher than a preset frequency of use are grouped into subgroups and arranged accordingly.

Figure 16:
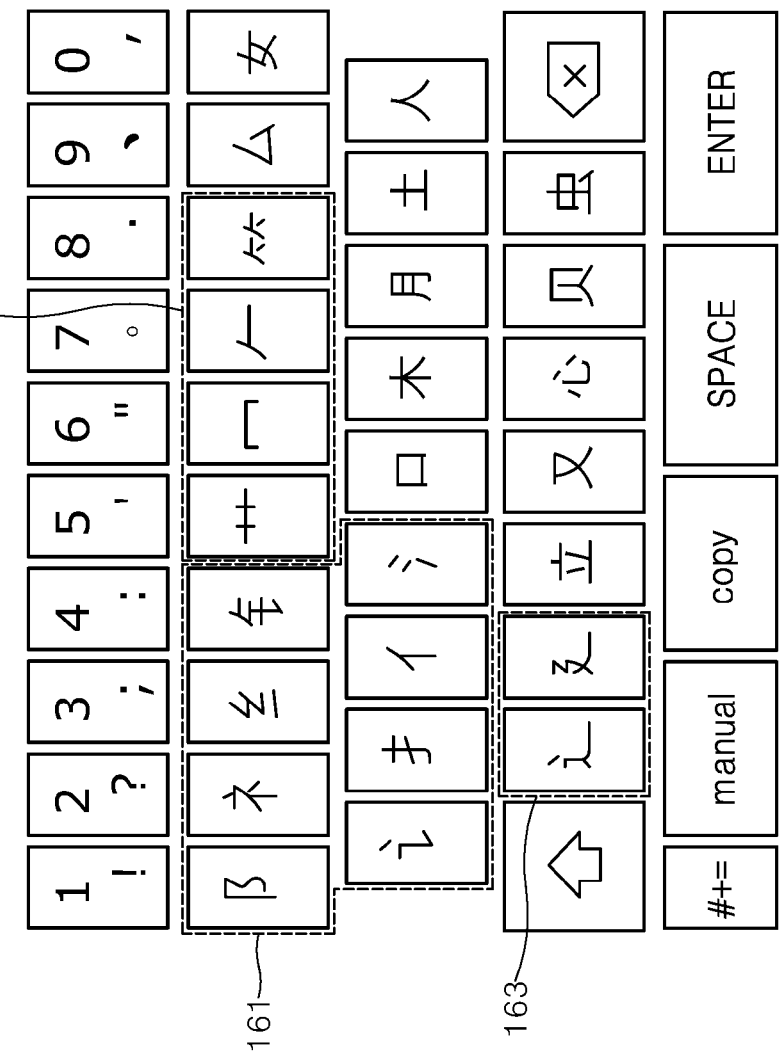
FIG. 16 illustrates an arrangement of middle unit keys included in the first to third middle unit key subgroups according to an embodiment of the present disclosure.

FIG. 16 illustrates an arrangement of basic middle unit keys included in the first to third basic middle unit key subgroups according to an embodiment of the present disclosure.

In one embodiment of the present disclosure, the subgroups included in the first basic middle unit key group 151 may include a first basic middle unit key subgroup 161 including 阝, 扌, 纟, 钅, 亻, 氵, 忄 and 冫 basic middle unit keys, a second basic middle unit key subgroup 162 including 艹, 冖, 广 and 竹 basic middle unit keys, and a third basic middle unit key subgroup 163 including 廴 and 辶 basic middle unit keys.

In this example, the arrangement of the first to third basic middle unit key subgroups 161 to 163 on the keyboard for typing Chinese character may be determined according to the positions (i.e., positions in the Chinese character) of the middle units displayed on the basic middle unit keys of each subgroup.

For example, as shown in FIG. 16, the basic middle unit keys included in the first basic middle unit key subgroup 161 may be disposed in the left side of the keyboard for typing Chinese character. At this time, the basic middle unit keys included in the first basic middle unit key subgroup 161 may include basic middle unit keys for the middle units positioned mainly in the left side of the Chinese character.

Likewise, the basic middle unit keys included in the second basic middle unit key subgroup 162 may be disposed in the upper side of the keyboard for typing Chinese character. In this example, the basic middle unit keys included in the second basic middle unit key subgroup 162 may include basic middle unit keys for the middle units positioned mainly in the upper part of the Chinese character.

Likewise, the basic middle unit keys included in the third basic middle unit key subgroup 163 may be disposed in the left lower side of the keyboard for typing Chinese character. In this example, the basic middle unit keys included in the third basic middle unit key subgroup 163 may include basic middle unit keys for the middle units positioned mainly in the left lower side of the Chinese character.

As described above, the keyboard for typing Chinese character according to the present disclosure has an advantage that the user can easily memorize the arrangement of the basic middle unit keys since the basic middle unit keys are grouped into respective subgroups according to the positions of the middle units in the Chinese character, while the user can also select middle unit intuitively to input Chinese characters quickly and easily.

Figure 17:
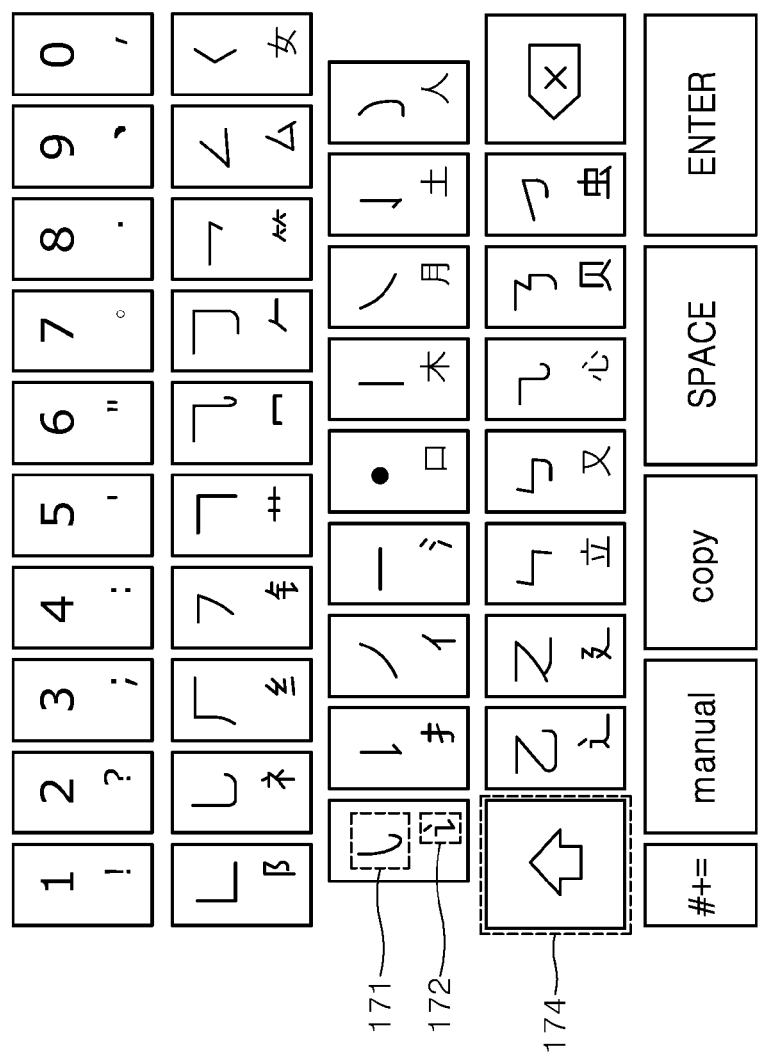
FIG. 17 illustrates an arrangement of base unit/middle unit keys of a keyboard for typing Chinese character according to an embodiment of the present disclosure.

FIG. 17 illustrates an arrangement of base unit/basic middle unit keys of a keyboard for typing Chinese character according to an embodiment of the present disclosure.

As described above, the keyboard for typing Chinese character according to an embodiment of the present disclosure may have both the base unit and the basic middle unit displayed on each key. Referring again to FIG. 17, both the ㄴ base unit 171 and the 亻 basic middle unit 172 are displayed on one key. That is, using one base unit/basic middle unit key, the user may select and input either the base unit or the basic middle unit displayed on the key.

Figure 18:
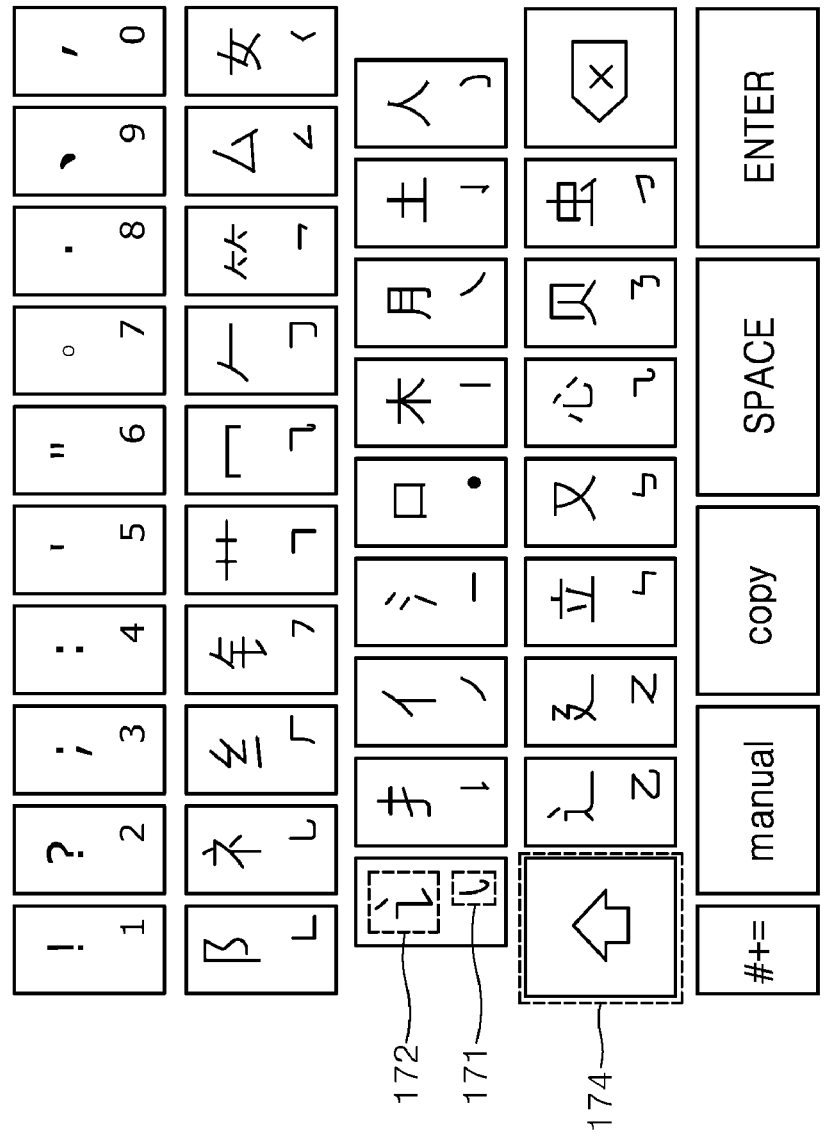
FIG. 18 illustrates a state in which the input mode of the keyboard for typing Chinese character is changed according to an embodiment of the present disclosure.

FIG. 18 illustrates a state in which the input mode of the keyboard for typing Chinese character is changed according to an embodiment of the present disclosure.

In one embodiment of the present disclosure, the user may switch the input mode of the keyboard for typing Chinese character by pressing the switch key 174 included in the keyboard for typing Chinese character.

As described above, the keyboard for typing Chinese character of the present disclosure may be a virtual keyboard displayed on a screen of a smart-phone or a tablet PC provided as a Chinese character input apparatus.

In this example, when the input mode of the keyboard for typing Chinese character is the base unit input mode, a base unit may be displayed on the upper part of each base unit/basic middle unit key, as shown in FIG. 17. When the keyboard for typing Chinese character is in the base unit input mode, if the user presses the base unit/basic middle unit key, the base unit displayed on the upper part of each base unit/basic middle unit key may be inputted to the Chinese character input apparatus.

Referring again to FIG. 17, both the ㄴ base unit 171 and the 亻 basic middle unit 172 are displayed on one key, and the ㄴ base unit 171 is displayed on the upper part of the base unit/basic middle unit key. At this time, if the user presses the base unit/basic middle unit key in which the ㄴ base unit 171 and 亻 the basic middle unit 172 are displayed, the ㄴ base unit 171 may be inputted to the Chinese character input apparatus.

Meanwhile, when the keyboard for typing Chinese character is in the base unit input mode, if the user presses the switch key 174, the input mode of the keyboard for typing Chinese character may be switched to the middle unit input mode, while a middle unit may be displayed on the upper part of the base unit/basic middle unit key, as shown in FIG. 18. When the keyboard for typing Chinese character is in the middle unit input mode, if the user presses the base unit/basic middle unit key, the basic middle unit displayed on the upper part of each base unit/basic middle unit key may be inputted to the Chinese character input apparatus.

Referring again to FIG. 18, both the ㄴ base unit 171 and the ㅣ basic middle unit 172 are displayed on one key, and the ㅣ basic middle unit 172 is displayed on the upper part of the base unit/basic middle unit key. At this time, if the user presses the base unit/basic middle unit key in which the ㄴ base unit 171 and the ㅣ basic middle unit 172 are displayed, the ㅣ basic middle unit 172 may be inputted to the Chinese character input apparatus.

That is, the keyboard for typing Chinese character having a virtual keyboard may display the current input mode of the keyboard for typing Chinese character, by switching the positions of the base units or the basic middle units displayed on each base unit/basic middle unit key as the input mode is switched through the switch key.

In one embodiment of the present disclosure, the user may input a basic middle unit displayed on the lower part of each base unit/basic middle unit key, as well as the base unit displayed on the upper part of each base unit/basic middle unit key, by pressing the respective base unit/basic middle unit key according to a preset method.

For example, when the keyboard for typing Chinese character is in the base unit input mode, the user may input a basic middle unit displayed on the lower part of each base unit/basic middle unit key by pressing the respective base unit/basic middle unit key for a preset reference time or longer.

As described above, since the user may select and input a base unit or a middle unit to the Chinese character input apparatus through the base unit/basic middle unit key of the keyboard for typing Chinese character of the present disclosure, the keyboard for typing Chinese character according to the present disclosure has an advantage that the user can input Chinese character quickly and simply by freely combining base units and middle units.

Chinese character input apparatus 1 according to an embodiment of the present disclosure may further include a memory. Memory can include high-speed random access memory or non-volatile memory, such as one or more magnetic disk storage devices, one or more optical storage devices, or flash memory (e.g., NAND, NOR). Memory can store an operating system, such as Darwin, RTXC, LINUX, UNIX, OS X, WINDOWS, or an embedded operating system such as VxWorks. The operating system may include instructions for handling basic system services and for performing hardware dependent tasks. In some implementations, the operating system can include a kernel (e.g., UNIX kernel).

Memory may also store communication instructions to facilitate communicating with one or more additional devices, one or more computers or one or more servers. Communication instructions can also be used to select an operational mode or communication medium for use by the device, based on a geographic location (obtained by the GPS/Navigation instructions) of the Chinese character input apparatus 1. Memory may include graphical user interface instructions to facilitate graphic user interface processing, including the graphical user interfaces and processes; sensor processing instructions to facilitate sensor-related processing and functions; phone instructions to facilitate phone-related processes and functions; electronic messaging instructions to facilitate electronic-messaging related processes and functions; web browsing instructions to facilitate web browsing-related processes and functions; media processing instructions to facilitate media processing-related processes and functions; GPS/Navigation instructions to facilitate GPS and navigation-related processes and instructions; camera instructions to facilitate camera-related processes and functions; dictionary module; language model; keyboard module; and keyboard model. The memory may also store other software instructions for facilitating other processes, features and applications.

Each of the above identified instructions and applications can correspond to a set of instructions for performing one or more functions described above. These instructions need not be implemented as separate software programs, procedures, or modules. Memory can include additional instructions or fewer instructions. Furthermore, various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to, communicate with, one or more mass storage devices for storing data files; such devices include magnetic disks, such as internal hard disks and removable disks; magneto-optical disks; and optical disks.

Storage devices suitable for tangibly embodying computer program instructions and data include all forms of non-volatile memory, including by way of semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a player, the features can be implemented on a computer having a display device, such as a CRT (cathode ray tube) or LCD (liquid crystal display) monitor for displaying information to the player. The computer can also have a keyboard and a pointing device such as a game controller, mouse or a trackball by which the player can provide input to the computer.

The features can be implemented in a computer system that includes a back-end component, such as a data server, that includes a middleware component, such as an application server or an Internet server, or that includes a front-end component, such as a client computer having a graphical user interface or an Internet browser, or any combination of them. The components of the system can be connected by any form or medium of digital data communication such as a communication network. Some examples of communication networks include LAN, WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed implementations can be implemented using an API. An API can define on or more parameters that are passed between a calling application and other software code (e.g., an operating system, library routine, function) that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

The foregoing exemplary embodiments and advantages are merely exemplary and are not to be construed as limiting the exemplary embodiments. Various replacements, modification and changes of a person skilled in the art who uses a basic concept of the present disclosure, which are defined in following claims, may be also within a scope of the present disclosure.

What is claimed is:

1. A Chinese character input apparatus which displays, on a screen, a virtual keyboard for typing Chinese characters, comprising:
   one or more hardware processors; and
   a non-transitory computer-readable medium storing instructions, which, when executed, are operable to cause the one or more processors to perform operations,
   wherein the virtual keyboard comprises:
   a first base unit key group comprising ㄴ, ㄴ, ㄷ, ㄱ, ㄱ, ㄱ, ㄱ, ㅡ, ㄥ and ㄑ base unit keys;
   a second base unit key group comprising ㄩ, ㅣ, ㄨ, —, ✱, l, ㄨ, ㅓ and ㄱ base unit keys; and
   a third base unit key group comprising ㄹ, ㄹ, ㄱ, ㄱ, ㄱ, ㄱ, and ㄱ base unit keys,
   wherein when a base unit key is selected, a list of recommended middle units comprising one or more middle units forming by the selected base key is generated on the virtual keyboard, and
   wherein when a plurality of base unit keys is selected, the generated list of recommended middle units are the same regardless of an order of the selected base unit keys.

2. The Chinese character input apparatus of claim 1, wherein the first base unit key group comprise:
   a first base unit key subgroup comprising the ㄴ and ㄴ base unit keys;
   a second base unit key subgroup comprising the ㄱ, ㄱ, ㄱ, ㄱ and — base unit keys; and
   a third base unit key subgroup comprising the ㄥ and ㄑ base unit keys.

3. The Chinese character input apparatus of claim 1, wherein the third base unit key group comprise:
   a first base unit key subgroup comprising ㄹ and ㄹ base unit keys;
   a second base unit key subgroup comprising ㄱ and ㄱ base unit keys; and
   a third base unit key subgroup comprising ㄱ, ㄱ and ㄱ base unit keys.

4. The Chinese character input apparatus of claim 1, wherein the ✱ base unit key is disposed at a center of the second base unit key group, and the base unit keys having symmetric shapes to each other are disposed in the left and right sides of the ✱ base unit key, respectively to be in point symmetry or line symmetry with each other about the ✱ base unit key.

5. A Chinese character input apparatus which displays on a screen a virtual keyboard for typing Chinese characters, comprising:
   one or more hardware processors; and
   a non-transitory computer-readable medium storing instructions, which, when executed, are operable to cause the one or more processors to perform operations,
   wherein the virtual keyboard comprises:
   a first basic middle unit key group having a frequency of use equal to or higher than a preset frequency of use and comprising subgroups of basic middle unit keys that have the same position in the left side of the Chinese characters, in the upper part of the Chinese characters, or in the left lower side of the Chinese characters, respectively; and
   a second basic middle unit key group comprising basic middle unit keys having a frequency of use equal to or higher than a preset frequency of use,
   wherein when a middle unit key is selected, a list of recommended Chinese characters forming by the selected middle unit key is generated on the virtual keyboard, and
   wherein when a plurality of middle unit keys is selected, the generated list of recommended Chinese characters are the same regardless of an order of the selected middle unit keys.

6. The Chinese character input apparatus of claim 5, wherein the first basic middle unit key group comprises ß, 扌, 纟, 钅, 氵, 冫, 亻, 彳, ⺌, 艹, ⺮, ⺈, ⺌, ⻌ and ⻊ basic middle unit keys.

7. The Chinese character input apparatus of claim 5, wherein the subgroups included in the first basic middle unit key group comprise:

a first basic middle unit key subgroup comprising 阝, 礻, 纟, 钅, 氵, 扌, 亻 and 冫 basic middle unit keys;

a second basic middle unit key subgroup comprising 宀, 冖, 广 and 𥫗 basic middle unit keys; and a third basic middle unit key subgroup comprising 辶 and 廴 basic middle unit keys.

8. The Chinese character input apparatus of claim 5, wherein the second basic middle unit key group comprises 厶, 女, 口, 木, 月, 土, 人, 立, 又, 心, 贝 and 虫 basic middle unit keys.

9. The Chinese character input apparatus of claim 5, wherein the second basic middle unit key group comprises a fourth basic middle unit key subgroup comprising 口, 木, 月, 土 and 人 basic middle unit keys.

* * * * *